US008530002B1

(12) United States Patent
Hibbs et al.

(10) Patent No.: US 8,530,002 B1
(45) Date of Patent: Sep. 10, 2013

(54) METHODS FOR ATTACHING POLYMERIZABLE CERAGENINS TO WATER TREATMENT MEMBRANES USING SILANE LINKAGES

(75) Inventors: Michael Hibbs, Albuquerque, NM (US); Susan J. Altman, Albuquerque, NM (US); Howland D. T. Jones, Rio Rancho, NM (US); Paul B. Savage, Mapleton, UT (US)

(73) Assignee: Sandia Corporation, Albuquerque, NM (US)

( * ) Notice: Subject to any disclaimer, the term of this patent is extended or adjusted under 35 U.S.C. 154(b) by 427 days.

(21) Appl. No.: 12/986,221

(22) Filed: Jan. 7, 2011

Related U.S. Application Data

(60) Provisional application No. 61/292,908, filed on Jan. 7, 2010.

(51) Int. Cl.
B05D 3/04 (2006.01)
B05D 3/10 (2006.01)

(52) U.S. Cl.
USPC ............ 427/508; 427/301; 427/333; 427/337

(58) Field of Classification Search
USPC ....................................................... 427/508
See application file for complete search history.

(56) References Cited

U.S. PATENT DOCUMENTS

| | | | |
|---|---|---|---|
| 6,280,853 B1 | 8/2001 | Mickols | |
| 6,495,043 B1 | 12/2002 | Heijnen | |
| 6,767,904 B2 * | 7/2004 | Savage et al. | 514/182 |
| 6,878,278 B2 | 4/2005 | Mickols | |
| 6,913,694 B2 | 7/2005 | Koo et al. | |
| 7,537,697 B2 | 5/2009 | Koo et al. | |
| 7,553,417 B2 | 6/2009 | Waller, Jr. et al. | |
| 7,677,398 B2 | 3/2010 | Belfer et al. | |
| 7,754,705 B2 | 7/2010 | Savage et al. | |
| 7,815,987 B2 | 10/2010 | Mickols et al. | |
| 2007/0191322 A1 | 8/2007 | Savage et al. | |

OTHER PUBLICATIONS

Susan J. Altman, Michael Hibbs, Howland D.T. Jones, Paul B. Savage, Lucas K. McGrath, Andres L. Sanchez, Benjamin D. Fellows, Jacob Pollard and Yanshu Feng. Use of Ceragenins to Create Novel Biofouling Resistant Waer-Treatment Membranes. Dec. 2008. Sandia National Laboratories.*
Yu, Hai-Yin, et al.,"Photoinduced graft polymerization of acrylamide on polypropylene microporous membranes . . . ", Separation and Purification Technology 53 (Jul. 2007) 119-125.
Zhu, Yabin, et al.,"Promoting the cytocompatibility of polyurethane scaffolds via surface photo-grafting . . . ", Jnl. of Mat. Science: Materials in Medicine 15 (2004) 283-289.
Savage, Paul B., et al., "Thin Films Containing Ceragenins Prevent Biofilm Form . . . ", IFIC 9th Cong. of the Int. Fed. of Infection Control, Santiago, Chile Oct. 16, 2008.
Savage, Paul B., et al,"Use of a Ceragenin-Based Coating to Pre." Brigham Young Univ., 48th Interscience Conf on Antimicrobial Agents and Chemotherapy, Wash., DC Oct. 26, 2008.
Jenssen, Havard, et al, "Peptide Antimicrobial Agents", Clinical Microbiology Reviews, Jul. 2006, p. 491-511 vol. 19, No. 3.
Savage, P.B., "Cationic Steroid Antibiotics", Current Medical Chemistry—Anti-Infective Agents, 2002, I, 293-304.

* cited by examiner

Primary Examiner — Dah-Wei Yuan
Assistant Examiner — Kristen A Dagenais
(74) Attorney, Agent, or Firm — Daniel J. Jenkins

(57) ABSTRACT

This invention relates to methods for chemically grafting and attaching ceragenin molecules to polymer substrates; methods for synthesizing ceragenin-containing copolymers; methods for making ceragenin-modified water treatment membranes and spacers; and methods of treating contaminated water using ceragenin-modified treatment membranes and spacers. Ceragenins are synthetically produced antimicrobial peptide mimics that display broad-spectrum bactericidal activity. Alkene-functionalized ceragenins (e.g., acrylamide-functionalized ceragenins) can be attached to polyamide reverse osmosis membranes using amine-linking, amide-linking, UV-grafting, or silane-coating methods. In addition, silane-functionalized ceragenins can be directly attached to polymer surfaces that have free hydroxyls.

6 Claims, 19 Drawing Sheets

Attachment Scheme-V

CSA-113 Synthesis Scheme

CSA-113

CSA-109

CSA-105 Synthesis Scheme

Attachment Scheme-I

Attachment Scheme-II

Attachment Scheme-III

Attachment Scheme-III

Structure-I

Attachment Scheme-V

Structure-II

CSA-113

Composition-I

Composition-II

CSA-113

CSA-120

CSA-121

CSA-122

Attachment Scheme VII

Attachment Scheme VIII

METHODS FOR ATTACHING POLYMERIZABLE CERAGENINS TO WATER TREATMENT MEMBRANES USING SILANE LINKAGES

CROSS-REFERENCE TO RELATED APPLICATIONS

This application claims the benefit of U.S. provisional patent application 61/292,908 filed Jan. 7, 2010, which is incorporated herein by reference. This application is related to a co-pending application by the same inventors entitled METHODS FOR ATTACHING POLYMERIZABLE CERAGENINS TO WATER TREATMENT MEMBRANES USING AMINE AND AMIDE LINKAGES, filed Jan. 6, 2011. This application is also related to a co-pending application by the same inventors, entitled BIOFOULING-RESISTANT CERAGENIN-MODIFIED MATERIALS AND STRUCTURES FOR WATER TREATMENT, filed Jan. 6, 2011.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates to methods for attaching polymerizable ceragenins and ceragenin-containing copolymers to polymer substrates; ceragenin-containing copolymers and ceragenin-containing copolymer structures made by these methods; and methods for treating contaminated water using ceragenin-modified treatment membranes and spacers.

Use of ceragenins can minimize or prevent biofouling of filtration membranes used for water treatment and purification. Biofouling (biological fouling) is the undesirable accumulation of microorganisms, plants, algae, etc. on wetted, structures. Biofouling, especially microfouling (biofilm formation and bacterial adhesion), impacts membrane separation processes for many industrial applications, such as: desalination, wastewater treatment, oil and gas extraction, and power generation. Biofilms comprise colonies of microorganisms that are attached to a surface and encased in extracellular polymeric substances (aka "slime"). The biofilm is able to trap nutrients for its own growth, and the slime protects the colonies from antibiotics and other anti-microbial agents.

Biofouling of a filtration membrane results in a loss of permeate flux and increase in energy use. For example, in a reverse osmosis (RO) desalination pilot plant using nanofiltration membranes, the normalized pressure drop (actual pressure drop normalized for flow and temperature) increased from about 200 kPa to 400 kPa within a two-week period. Biological analysis of the membranes showed high biofilm densities on the feed side of the spiral wound membrane elements.

The energy sector is concerned about biofouling as water recycling becomes more and more prevalent. Examples include re-use of cooling water, and water used for steam injection for heavy oil extraction. Other sectors that need ultrapure water, such as pharmaceuticals, and the microchip and electronics industries, can also benefit from biofouling resistant membranes.

Traditional methods for preventing biofouling of water treatment membranes include: (1) minimizing microorganisms and nutrients in the feed water and (2) membrane cleaning. Chemical treatment includes the use of silver nanoparticle coatings, chlorine ($Cl_2$) and chlorine dioxide ($ClOC_2$) biocides, hydrogen peroxide, and sodium chlorite/hypochlorite. Although oxidizing biocides, such as chlorine, effectively control biogrowth in pipes and filtration membranes, the chlorine significantly damages and degrades RO membranes made of polyamide materials. Silver nanoparticles are expensive, and have other problems.

What is needed is a biocidal material or coating that can be attached onto, or incorporated into, water treatment membranes and/or to spacers that separate adjacent layers of membrane. Ideally, the bacteria are killed before they can colonize, with the dead organisms being swept away by the reject water. The desired biocidal material or coating would have a broad spectrum bactericidal activity, be selectively toxic to prokaryotic cells over eukaryotic cells (e.g., bacteria over human cells), be capable of rapidly killing target organisms, wouldn't allow bacteria to develop a resistance to the biocidal material, and have a long lifetime and low-cost.

Against this background, the present invention was developed.

SUMMARY OF THE INVENTION

This invention relates to methods for chemically grafting and attaching ceragenin molecules to polymer substrates; methods for synthesizing ceragenin-containing copolymers; methods for making ceragenin-modified water, treatment membranes and spacers; and methods of treating contaminated water using ceragenin-modified treatment membranes and spacers. Ceragenins are synthetically produced antimicrobial peptide mimics that display broad-spectrum bactericidal activity. Alkene-functionalized ceragenins (e.g., acrylamide-functionalized ceragenins) can be attached to polyamide reverse osmosis membranes using amine-linking, amide-linking, UV-grafting, or silane-coating methods. In addition, silane-functionalized ceragenins can be directly attached to polymer surfaces that have free hydroxyls.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1:
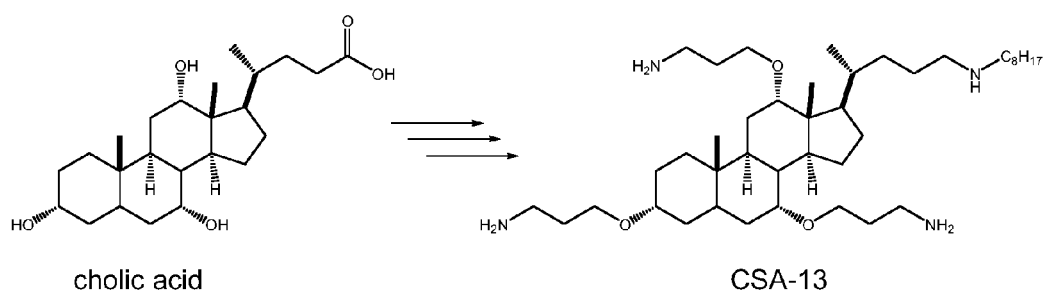
FIG. 1 shows the chemical structure of a CSA-13 ceragenin, which can be derived from cholic acid.

The present invention generally relates to methods for chemically grafting (i.e., attaching) polymerizable ceragenin molecules to polymer substrates, and structures made by the methods. The methods can be used to manufacture biofouling-resistant, ceragenin-modified water treatment membranes and spacers used in water treatment and purification. Filtration/treatment membranes are used in microfiltration (MF), ultrafiltration (UF), nanofiltration (NF), and reverse osmosis (RO) fluid treatment applications; especially water treatment. Grafting/attaching ceragenins to (or, immobilizing ceragenins on) surfaces of treatment membranes or spacers adds a biocidal capability to the membranes or spacers, so that bacteria will be killed and swept away before they can colonize and form adherent biofilms.

Note that anywhere in the specification and/or claims where the solvent "ethanol" is used, ethanol can be substituted with other substantially similar solvents, such as methanol or isopropanol. In other words, the three solvents: ethanol, methanol, and isopropanol, are considered to be interchangeable for the present invention. Also, the term "aqueous-based solution" is intended to describe solutions wherein water is the majority solvent (by weight).

Ceragenins are synthetically produced small molecule antimicrobial peptide mimics that display broad-spectrum bactericidal activity. These mimics consist of a steroid backbone with amino acids or other chemical groups attached to them. These compounds have a net positive charge, which is electrostatically attracted to the negatively charged cell membranes of certain viruses, fungi and bacteria. Since ceragenins are cationic under physiological conditions, they associate strongly with anionic substances, including bacterial cell membrane components. Because they have a high binding affinity for cell membranes (including Lipid "A"), ceragenins are able to rapidly disrupt the target membranes, leading to rapid cell death. Ceragenins are also highly soluble in water.

The ceragenin family of synthetic molecules was developed by Dr. Paul Savage at Brigham Young University in 1998, and is described in U.S. Pat. Nos. 6,350,738; 6,767,904; 2007/0191322; and 7,754,705, all of which are incorporated herein by reference. The ceragenin family of molecules offers greater ease of synthesis and improved stability as compared to endogenous antimicrobial peptides (such as the human cathelicidin LL-37 and the magainins). Ceragenins were developed to mimic the cationic, facially amphiphilic structures of most natural occurring antimicrobial peptides. Ceragenin compounds reproduce the required morphology using a bile-acid (cholic acid) scaffolding and appended amine groups. The resulting compounds are bactericidal against both Gram-positive and Gram-negative organisms, including drug-resistant bacteria.

Ceragenins are believed to function via the 'carpet' model, wherein the compounds aggregate on the bacterial cell surface and displace patches of the membrane. Membrane integrity is lost and permeability is altered, eventually comprising the bacterial cell. These synthetic peptide mimics are capable of rapidly killing target organisms, they have a broad spectrum of activity, and they are selectively toxic to prokaryotic cells over eukaryotic cells (e.g., bacteria over human cells). They are simple to prepare and purify on a large scale, are more stable than antimicrobial peptides, and it is anticipated that wide use will not engender emergence of resistant organisms because ceragenins mimic natural host defenses.

Figure 2:
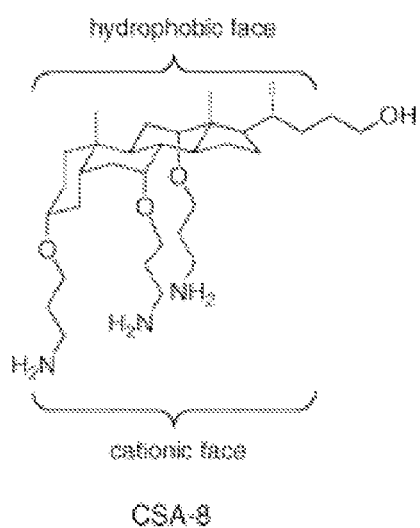
FIG. 2 shows a perspective view of the chemical structure of a CSA-8 ceragenin.

FIG. 1 illustrates the chemical structure of a typical ceragenin, CSA-13, and a starting material, cholic acid. Ceragenins are based on a rigid steroid core (the system of four fused saturated rings) with several substituents arranged in such a way that one face of the molecule is hydrophilic, while the other face is hydrophobic. In the case of CSA-13, it is the three primary amines (which become ammonium salts when protonated) that cause the near face of the molecule to be hydrophilic. It is this arrangement of hydrophilic and hydrophobic regions that enables ceragenins to mimic antimicrobial peptides. This arrangement can be seen better in FIG. 2, which shows a perspective view of CSA-8. Substituents on the upper right corner of a ceragenin (see, e.g., FIG. 1) can be varied to provide specific functionalities, without having a large impact on the biocidal activity of the entire ceragenin. It is that region of the molecule that can be used as a "handle" for attaching specific functionalities to produce specific desired properties (such as adding functional groups to make the ceragenin polymerizable).

Figure 3:
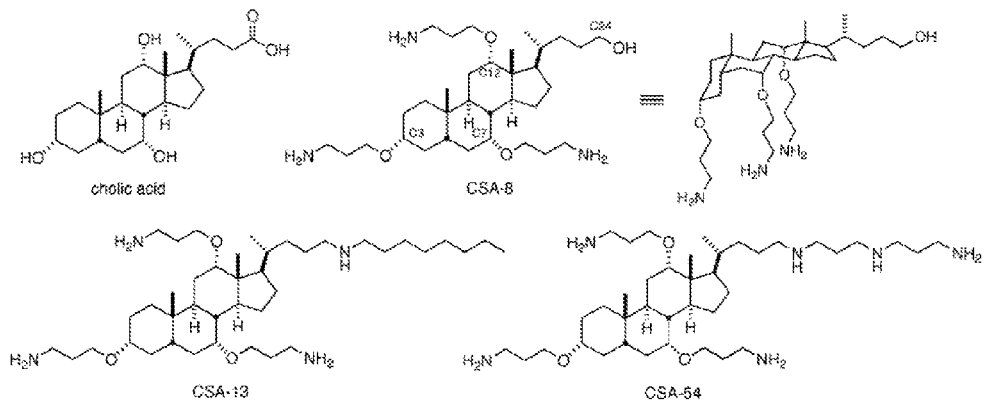
FIG. 3 shows the chemical structures of three different ceragenin molecules: CSA-8, CSA-18, and CSA-54.
Figure 4A:
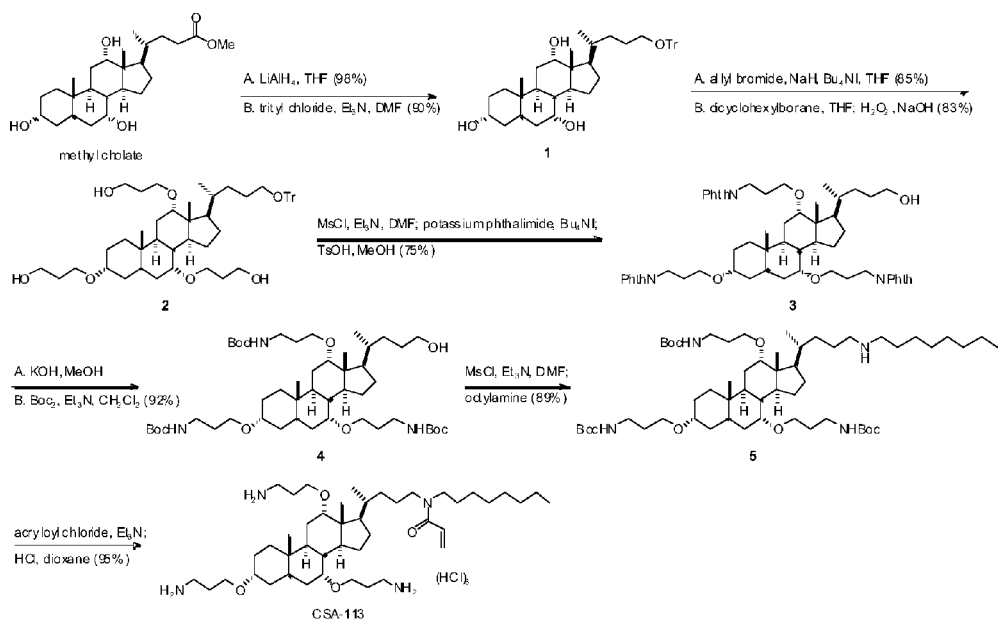
FIG. 4A shows an example of a scheme for synthesizing CSA-113 ceragenin.
Figure 4B:
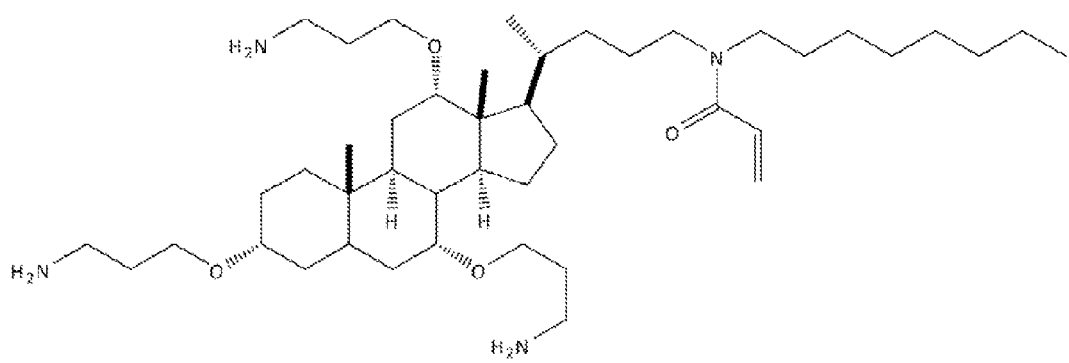
FIG. 4B shows the chemical structure of CSA-113 ceragenin.
Figure 4C:
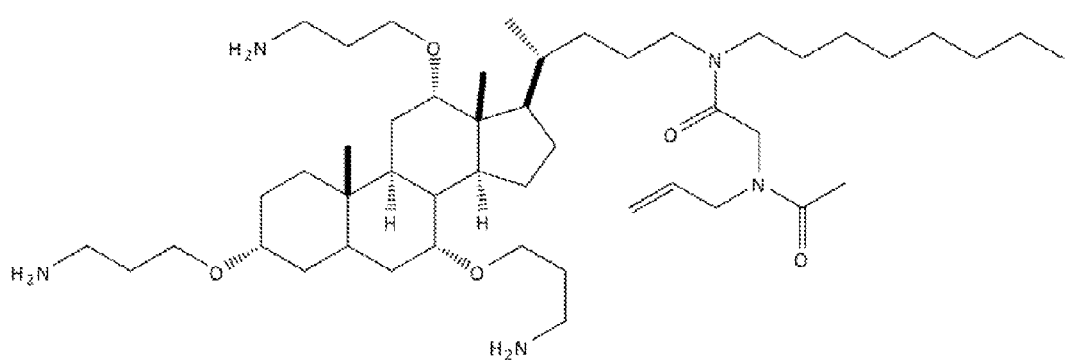
FIG. 4C shows the chemical structure of CSA-109 ceragenin.

As many as 100 different versions of ceragenin molecules have been synthesized. FIG. 3 shows the chemical structures of three different versions of ceragenin molecules: CSA-8, CSA-18, and CSA-54. FIG. 4 shows an example of a synthesis scheme for making a preferred ceragenin, CSA-113. The synthesis scheme has eight steps and a total yield of 36%. In the last step shown in FIG. 4, an acrylamide moiety is added, which functionalizes CSA-113 in such a way so that it can be polymerized and/or attached to the surface of a polyamide substrate (e.g., the ultra-thin film polyamide membranes used in RO cartridges).

While the present invention is useful for all types of materials (e.g., porous membranes) used for water (or other liquids) treatment and/or filtration, preferred applications include polyamide nanofiltration and reverse osmosis (RO) using polyamide membranes (e.g., for desalination).

Reverse osmosis (RO) is the process of forcing a solvent from a region of high solute concentration through a semipermeable membrane to a region of low solute concentration by applying a pressure in excess of the osmotic pressure. The membranes used for reverse osmosis have a dense "barrier" layer bonded to a porous polymer matrix where most separation occurs. In most cases, the membrane is designed to allow water to pass through the barrier layer, while preventing the passage of solutes (such as salt ions). This process requires that a high pressure be exerted on the high concentration side of the membrane, usually 2-17 bar (30-250 psi) for fresh and brackish water, and 40-70 bar (600-1000 psi) for seawater, which has around 24 bar (350 psi) natural osmotic pressure that must be overcome. This process is best known for its use in desalination (removing the salt from sea water to get fresh water), but since the early 1970s it has also been used to purify fresh water for medical, industrial, and domestic applications.

RO filter cartridges are typically rigid plastic or metal cylinders containing a spiral-wound, thin-film composite (TFC) membrane that acts as a semipermeable membrane or molecular sieve. TFC membranes typically comprise three bonded layers: (1) a meso-porous polyester supporting layer that acts as a reinforcing backing fabric or web; (2) a micro-porous intermediate later, usually made of a polysulfone; and (3) an ultrathin (e.g., 100-200 nm) "barrier" or "discrimination" layer made of a polyamide (which can be a cross-linked polyamide). The polyamide discrimination/barrier membrane/layer passes water molecules through, but rejects salt and silica. Examples of commercially available polyamide RO membranes include: the "FT-30™" polyamide TFC membrane made by the FilmTec Corporation, a subsidiary of The Dow Chemical Company; a brackish water desalination polyamide membrane made by GE Osmonics, a subsidiary of General Electric Corp. (later referred to as "GE BWRO"); and two different seawater RO membranes made by Separation Systems Technology, Inc. (later referred to as "SWRO SST1" and "SWRO SST2"). These membranes can be configured as spiral-wound, hollow fiber, tubular, or flat sheet type membrane configurations. Optionally, a spiral-wound sheet comprising a diamond-shaped, plastic mesh spacer (e.g., Vexar®, which is made of low-density polyethylene) can be placed in-between adjacent sheets of the TFC membrane. Examples of the micro-porous supporting layer include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride.

Poly(amides) (i.e., polyamides) are polymers containing monomers of amides joined by peptide bonds. The amide linkages (—C(O)NH—) occur along the molecular chain. Polyamides generally contain sufficient residual amine groups for sequestration of functionality on the membranes (see, e.g., U.S. Pat. No. 6,280,853). In particular, the SWRO SST2 sample membrane was custom-made for the present inventors to have more (i.e., unreacted) amines on the membrane surface that is commonly found.

Prior to modifying/treating the surface with ceragenins, according to the present invention, the polyamide discrimination/barrier membrane/layer may be pre-coated with other modifiers, such as polyethylene glycol, or with hygroscopic polymers, such as polymeric surfactants, polyvinyl alcohol, and polyacrylic acid. Also, during manufacture of the polyamide membrane, various additives can be utilized (as described in U.S. Pat. No. 6,878,278) to further optimize or customize performance of the underlying polyamide material for a specific application.

In the present invention, a variety of general methods were developed for attaching (i.e., chemically grafting) ceragenin molecules to polymer substrates (e.g. a polyamide substrate for a RO membrane), including: (1) using residual amine or carboxylic acid groups on the membrane surface to form amide linkages to the ceragenin, (2) using a radical reaction to graft oligomers carrying multiple ceragenins to the membrane surface, (3) using ultraviolet (UV) irradiation to graft the ceragenins, and (4) functionalizing the polymer surface with aminosilane groups that have reactive moieties (e.g., free amine or hydroxyl groups), and (5) bonding silane-functionalized ceragenins to free hydroxyl groups on the substrate. In some preferred embodiments, it is believed that the ceragenin modifier becomes chemically bound to the polyamide membrane via covalent bonds with unreacted amines and/or carboxylic acid groups of the polyamide membrane.

In addition, the ceragenin core can be modified to make it easier to graft to a surface. A reactive group can be added to serve as the point of attachment to a tether that can covalently connect the ceragenin to the membrane surface.

Optionally, a fluorophore can also be attached to the ceragenin in order to help visualize ("see") the ceragenin. This can be useful in verifying with a hyperspectral scanner that the ceragenin has, indeed, been attached to the membrane, and for quantifying the density of ceragenins present. A connector consisting of two amide groups can be used to attach both the reactive attachment group (e.g., an allyl group) and the fluorophore to the ceragenin core.

In the present invention, the ceragenin-containing coating (modifier) is disposed upon (or, reacted with) at least a portion of a surface (e.g., the active, outward-facing surface of a polyamide membrane designed to contact feed fluid) of a polymer substrate, and preferably covers the entire active, outward-facing surface. The attachment methods described herein may be integrated into the method of making a polyamide membrane itself (e.g., during the actual formation of the polyamide membrane itself), or practiced after the formation of the polyamide membrane.

The term "reaction product", as used in the present invention, is intended to describe a wide range of associations including: the formation of covalent bonds such as grafting, branching, and crosslinking; interactions involving secondary forces such as hydrogen bonding; and/or interactions involving physical entanglement. Non-limiting examples include: grafted copolymers, polymer blends, polymer alloys, and interpenetrating polymer networks (IPN). In some embodiments, the polymerization reactions occurs in such a way that the reaction products form desirable brush or brush-like structures, which generally extend away from the surface being modified with the ceragenin-containing materials. In general, the reaction products remain sufficiently associated with the polymer substrate (e.g., polyamide membrane) so that it remains disposed upon the substrate (e.g., membrane surface) during treatment/filtration operations (i.e., remains analytically detectable after 24 hours of continuous membrane use under standard operating conditions), and even after standard membrane cleaning procedures.

Figure 5:
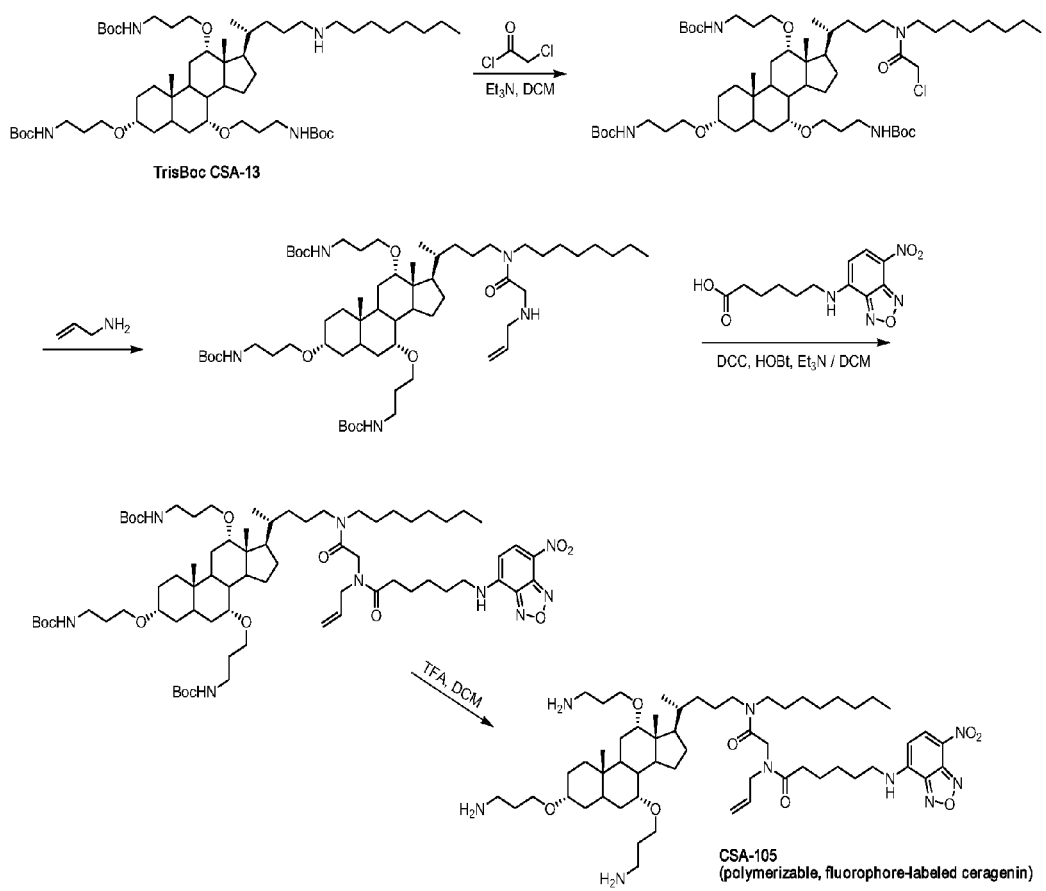
FIG. 5 shows an example of a scheme for synthesizing CSA-105 ceragenin.
Figure 6:
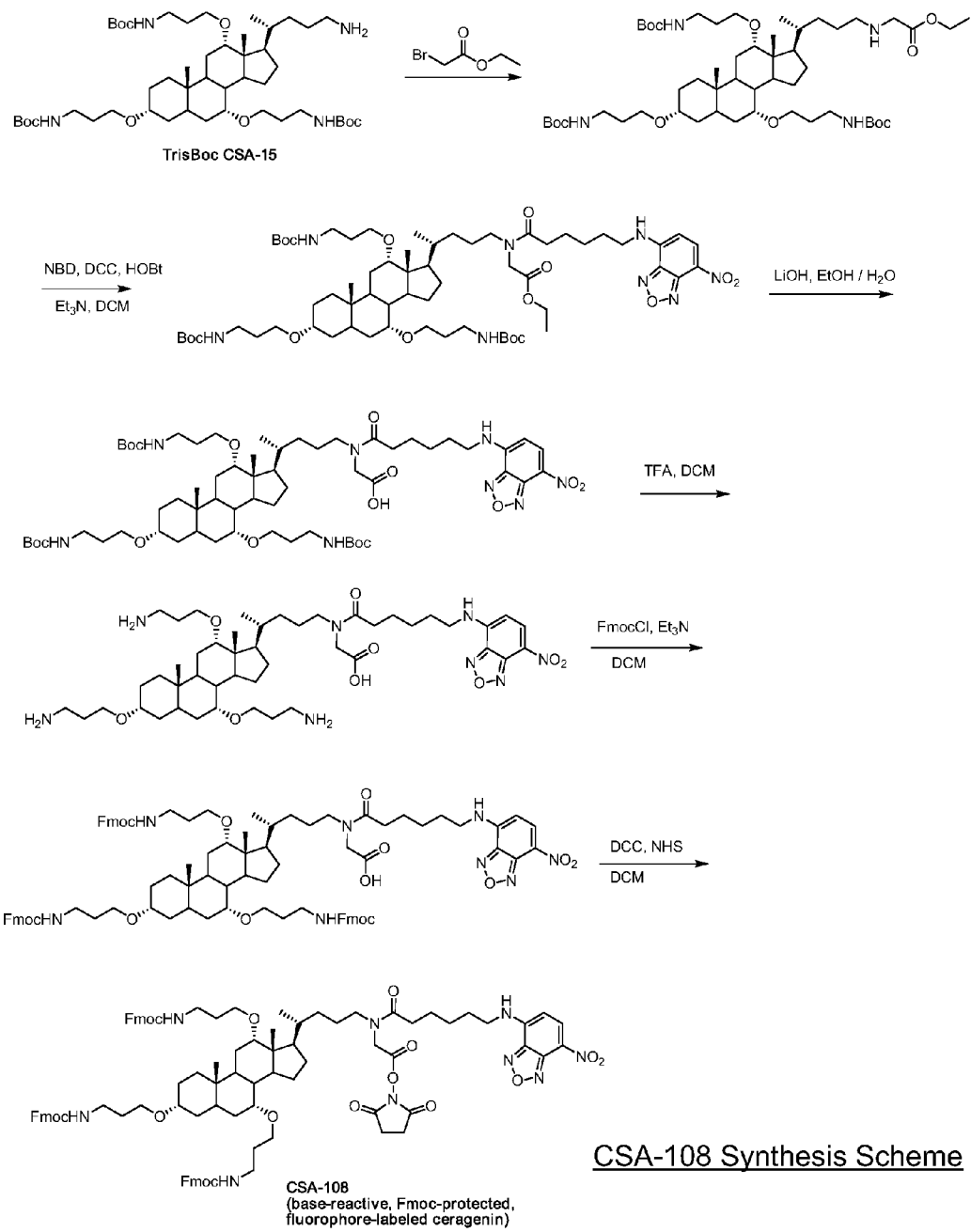
FIG. 6 shows an example of a scheme for synthesizing CSA-108 ceragenin.

FIG. 5 shows an example of a first ceragenin synthesis scheme (CSA-105 Synthesis Scheme-I) for CSA-105, and FIG. 6 shows an example of a second ceragenin synthesis scheme (CSA-108 Synthesis Scheme-II) for CSA-108. In CSA-105, the point of attachment is the terminal alkene, and in CSA-108 the point of attachment is the N-hydroxysuccinimide ester. After attaching CSA-108 to the membrane, the Fmoc groups on the amines on CSA-108 can be removed in a deprotection step using an organic base. In both CSA-105 and CSA-108 the fluorophore is nitrobenzoxadiazole (NBD) (the heteroatom-containing fused ring system on the right side of both ceragenins as shown in FIGS. 5 and 6). CSA-109 is the same molecule as CSA-105, but without the NBD fluorophore.

We initially developed two preliminary membrane attachment methods for the newly prepared ceragenins. Membrane attachment Scheme-I was based on the report of Belfer, S.; Purinson, Y.; Kedem, O. *Acta Polym.* 1998, 49, 574.

Attachment Scheme-I

Figure 7:
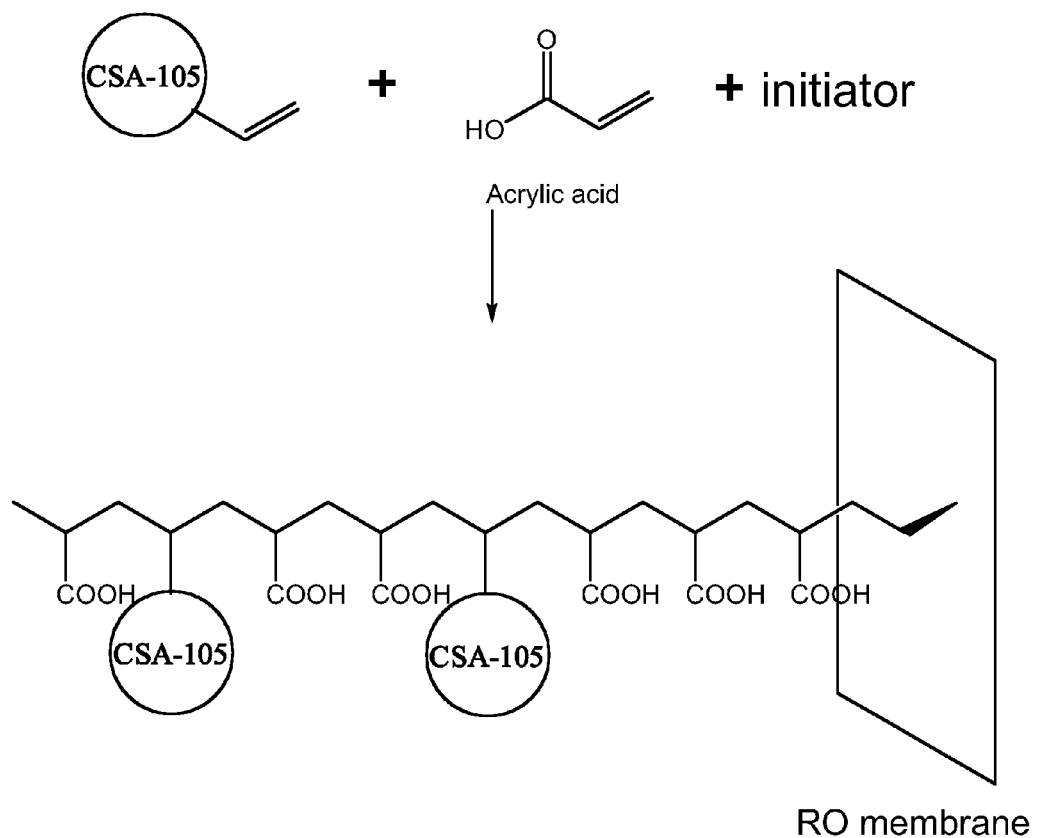
FIG. 7 shows an example of Attachment Scheme-I.

FIG. 7 schematically illustrates an embodiment of a first attachment scheme (Scheme-I), according to the present invention. In scheme-I, a mixture of CSA-105 ceragenin and acrylic acid in water is placed on the surfaces of six RO membranes, each bounded by a PTFE O-ring. A solution of initiators (e.g., a mixture of potassium persulfate and sodium metabisulfite) is added to each, and the O-rings were then covered to limit evaporation. The reactions is allowed to take place at room temperature and pairs of samples are removed and rinsed thoroughly with water after time intervals of 1, 2, and 24 hours. This method has the advantage that each of the oligomers formed should contain multiple ceragenins, so even if the number of attached oligomers is low, the density of ceragenins should be high.

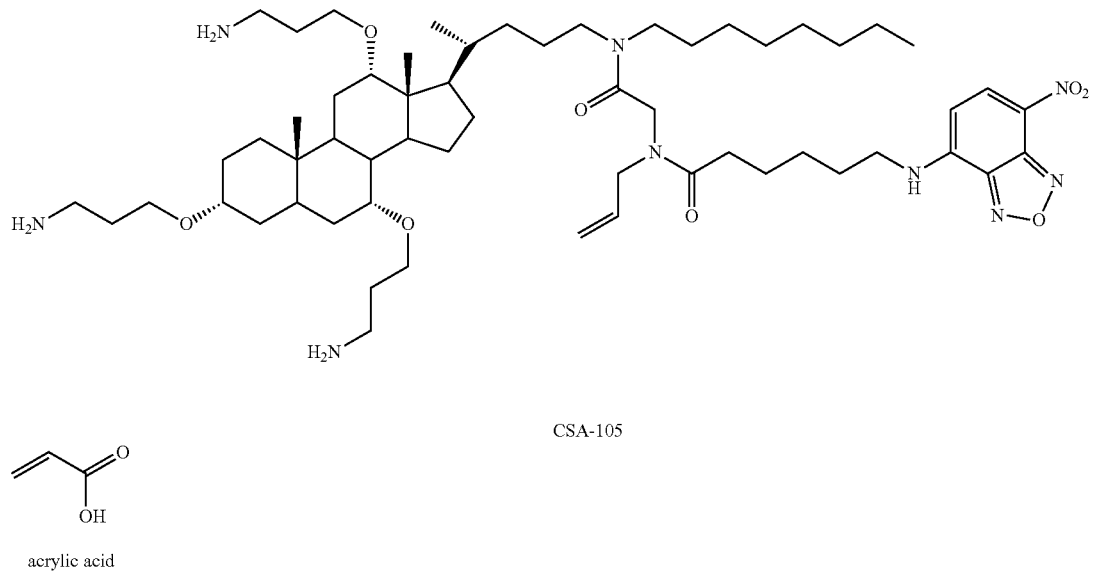

CSA-105 acrylic acid

Attachment Scheme-II

Figure 8:
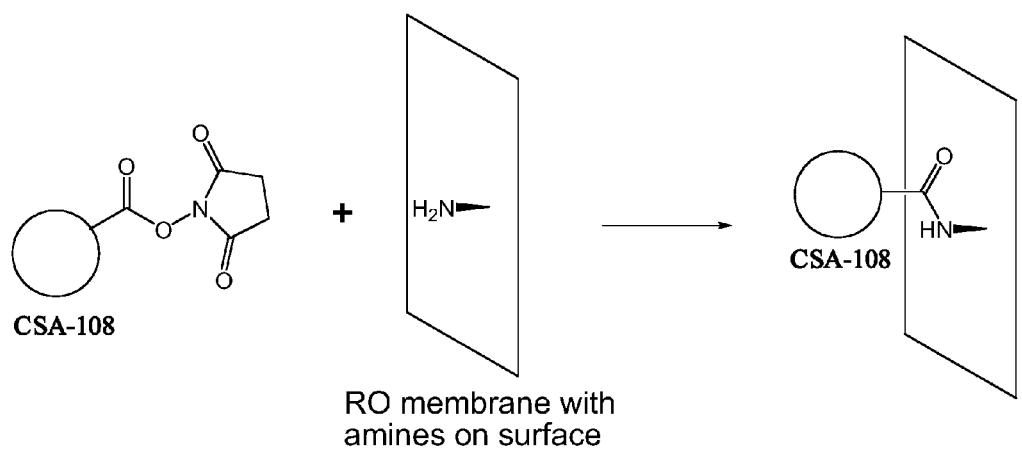
FIG. 8 shows an example of Attachment Scheme-II.

FIG. 8 schematically illustrates an embodiment of a second attachment scheme (Scheme-II), according to the present invention. Scheme-II is based on previous work by Ding, B.; Yin, N.; Liu, Y.; Cardenas-Garcia, J.; Evanson, R.; Orsak, T.; Fan, M.; Turin, G. Savage, P. B. *J. Am. Chem. Soc.* 2004, 126, 13642. In scheme-II, ceragenin (CSA-108) has an activated ester (an N-hydroxysuccinimide group), which will readily react with a free amine on the surface of the RO membrane to form an amide linkage. This method is a direct way of attaching ceragenins to membranes, but it will only allow for one ceragenin to attach per free amine on the surface.

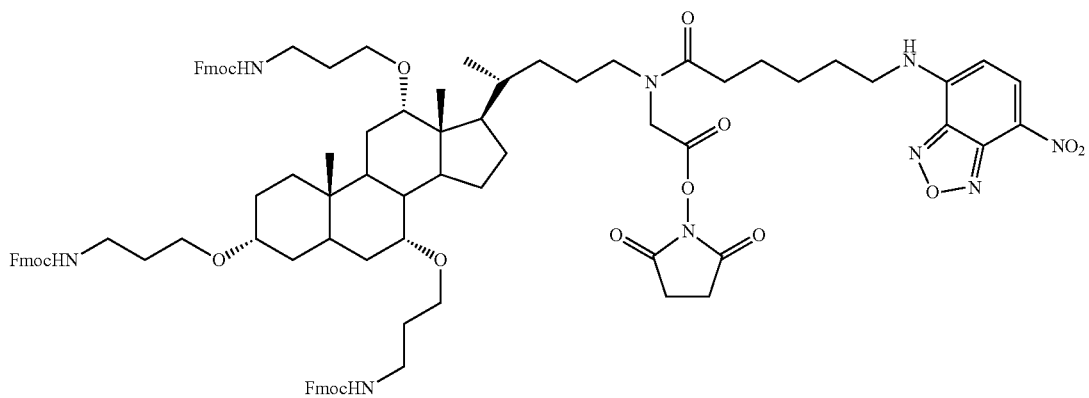

CSA-108

Alternative attachments schemes, according to the present invention, may use oligomeric polyethylene glycol)-based tethers to attach the ceragenin.

Attachment Scheme-III

Figure 9A:
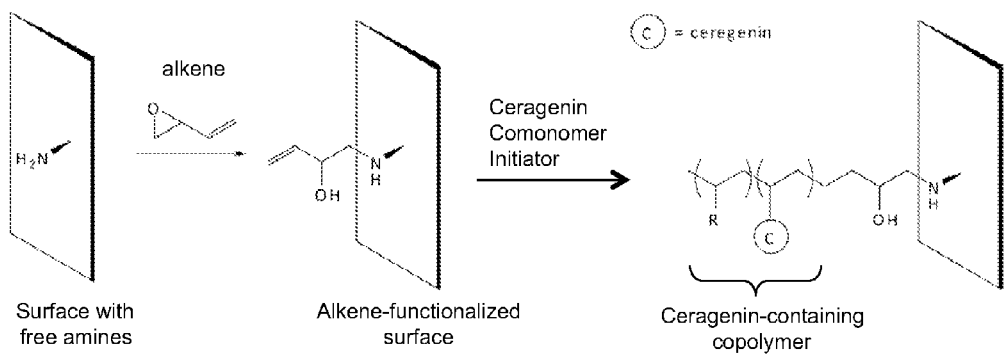
FIG. 9A shows an example of Attachment Scheme-Ill.
Figure 9B:
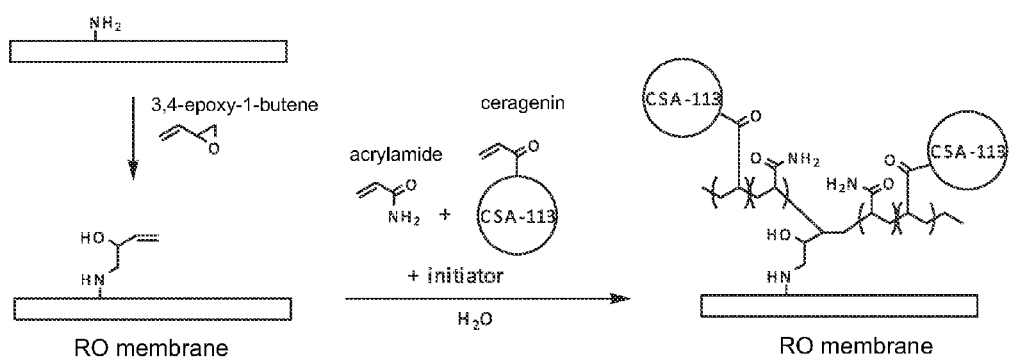
FIG. 9B shows another example of Attachment Scheme-Ill.

FIGS. 9A and 9B schematically illustrate an embodiment of a third attachment scheme (Scheme-III), according to the present invention. In Scheme-III, unreacted (free) amines on an amine-functionalized surface of a polymer substrate (e.g., free amines on a polyamide RO membrane) are first treated with an alkene (e.g., 3,4-epoxy-1-butene) (in order to attach an alkene to the free amines on the polymer's surface. Then the alkene-functionalized surface is contacted with an aqueous monomer solution comprising an alkene-functionalized ceragenin monomer (e.g., CSA-113), a comonomer (e.g., acrylamide), and a radical initiator. After contacting and initiation, a chain growth polymerization occurs and some of these reaction products (i.e., polymer chains) react with and attach to the alkenes bound to the polymer's surface. The surface alkenes are consumed and incorporated into ceragenin-containing copolymers (e.g., acrylamide/ceragenin copolymers). The result is a ceragenin-modified polymer surface with covalently attached copolymer chains that are chemically grafted to, and extend off of, the substrate's surface and into the water. Each one of these "brush-like" copolymer chains can contain many ceragenin molecules; and the ratio of comonomer (e.g., acrylamide) to ceragenin (e.g., CSA-113) can be varied to change the average spacing between ceragenins on a single chain. In the embodiment shown in FIGS. 9A and 9B, the ceragenin-containing copolymer is attached to the polymer's surface via an amine-linkage.

In general, attachment Scheme-III is a method of chemically grafting one or more alkene-functionalized ceragenins to a polymer substrate using amine-linkages, comprising: (a) providing a polymer substrate with free amine groups; (b) attaching alkenes to the free amines; (c) initiating polymerization reactions in a monomer solution comprising: alkene-functionalized ceragenins, a comonomer, an initiator, a solvent, and the alkenes that are attached to the polymer substrate; and (d) forming ceragenin-containing copolymers that are attached to the polymer substrate via amine-linkages. The polymer substrate can be a polyamide or polyethylene substrate. The alkene can be an epoxy, such as: 3,4-epoxy-1-butene, 1,2-epoxy-5-hexene, or 1,2-epoxy-7-octene. The alkene-functionalized (i.e., carbon-carbon double bond-functionalized) ceragenin can be CSA-113, CSA-109, or CSA-120. In general, the comonomer can be an α,β-unsaturated carbonyl-type monomer. Some preferred comonomers include: acrylamide, acrylic acid, acrylonitrile, methyl acrylate, methyl methacrylate, and maleic anhydride. The initiator can be potassium persulfate and/or sodium metabisulfite. The solvent can be water. Preferably, the amine end groups on the ceragenin molecules are protonated (i.e., the ceragenin is in the salt form before making up the monomer solution in step (c)).

In other embodiments of Attachment Scheme-III, the monomer solution can comprise any well-known surfactant or wetting agent, to help improve surface coverage of the polymer substrate. Additionally, the monomer solution can further comprise a crosslinker or cross-linking agent (e.g., N,N'-ethylenebis(acrylamide), N,N'-propylbis(acrylamide), or 1,3-butadiene) to increase the size of the copolymer chains (and, hence, the number of ceragenin molecules incorporated) by introducing branched structures.

The polymer substrate can comprise a polyamide thin-film membrane, which can be a reverse-osmosis membrane with a thickness ranging from 100 to 200 nm that can be attached to a micro-porous polysulfone supporting layer. The ratio of the amount of alkene-functionalized ceragenin to the amount of comonomer in the monomer solution can be varied, depending on the desired amount of spacing between ceragenin molecules on the copolymer chain. For example, the mole ratio of ceragenin-to-comonomer can range from as low as 1:50, to as high as 100% ceragenin with 0% comonomer.

The method of Scheme-III can be more specifically performed, using a polyamide substrate, according to the following steps:
a) soaking a polyamide substrate in a first solution comprising a 5% solution of sodium bicarbonate (aqueous) for 1-2 hours;
b) rinsing the substrate with water, then dipping briefly in isopropyl alcohol;
c) soaking the substrate for 10-20 minutes in a second solution heated to 40-50° C., wherein the second solution comprises 1 to 10 weight % of 3,4-epoxy-1-butene dissolved in isopropyl alcohol;
d) rinsing the substrate with isopropyl alcohol and then water;
e) exposing a surface of the substrate to a monomer solution comprising a mixture of ceragenin and acrylamide monomers in water; wherein the mole fraction of ceragenin in the monomer solution ranges from 2% to 100%, and the monomer concentration ranges from 0.01 M to 1 M;

f) adding an initiator comprising potassium persulfate and sodium metabisulfite in a 3:1 weight ratio to the monomer solution, such that the combined mass of the initiators is 2 to 10 weight percent based on the mass of the monomers; and then allowing a radical polymerization reaction to occur at room temperature for a sufficient time (e.g., 24 hours); and g) rinsing the substrate with water.

Figure 10:
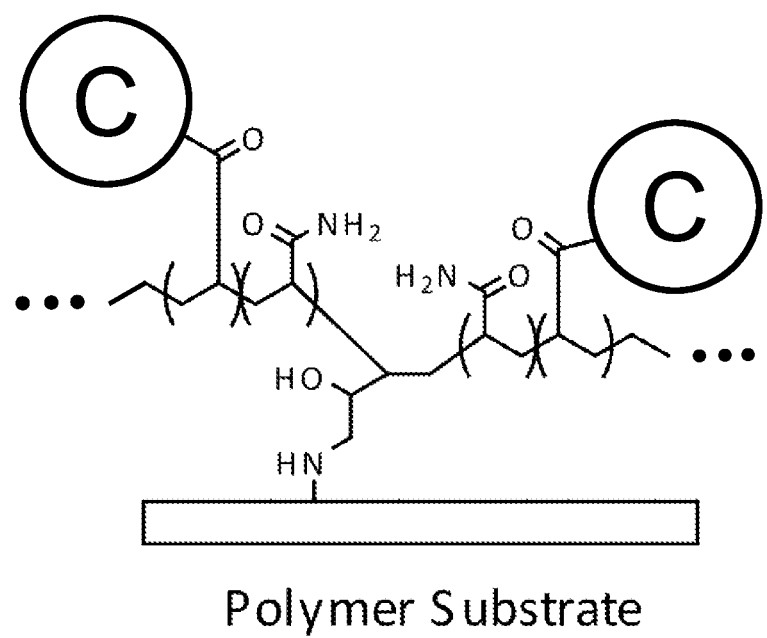
FIG. 10 shows the chemical structure of Structure-I.

FIG. 10 schematically illustrates a first example of a biofouling-resistant reaction product (Structure-I), which can be made according to Scheme-III. FIG. 10 shows a simplified structure of a polymer chain of acrylamide/ceragenin copolymers chemically grafted to a surface of a polymer substrate via an amine-linkage. The resulting ceragenin-containing coating likely has a much more complex structure, which may include multiple crosslinks between, multiple acrylamide and/or ceragenin monomers, along with hydrogen bonding and polymer chain entanglement and penetration of the polymer substrate (e.g. a nano-porous polyamide membrane).

The ceragenin "C" in Structure-I can be any alkene-functionalized ceragenin. In particular, the ceragenin "C" can be CSA-105, CSA-109, CSA-113, or CSA-120.

Example 1

Example 1 illustrates an example of using Attachment Scheme-III to attach ceragenins to a polyamide membrane. A 2"×4" piece of polyamide RO membrane was pretreated by soaking in a 5% solution of sodium bicarbonate (aqueous) for 1-2 hours. Then it was rinsed with water, dipped briefly into isopropyl alcohol (IPA) and then the surface was treated with 800 mg of 3,4-epoxy-1-butene dissolved in 32 mL of IPA. During this treatment, the membrane and solution were heated to 45° C. for 15 minutes. The membrane was rinsed with IPA and then water. The surface of the membrane was then treated with a solution of CSA-113 (224 mg), acrylamide (19 mg) in 26.67 mL water. The initiator (0.83 mg potassium persulfate+0.28 mg sodium metabisulfite) was added and the reaction was allowed to take place at room temperature for 24 hours. Finally, the membrane was rinsed with water.

Structure-I

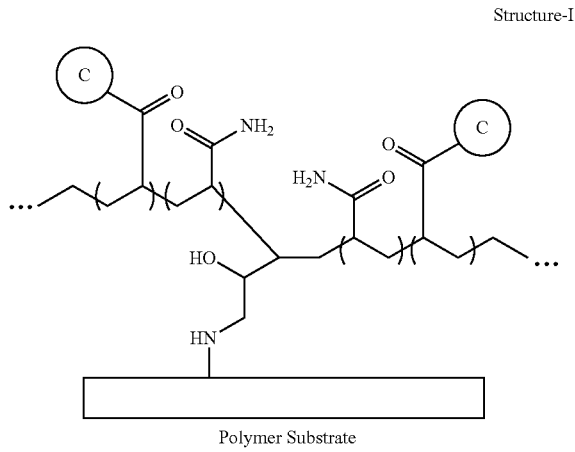

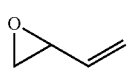

3,4-epoxy-1-butene

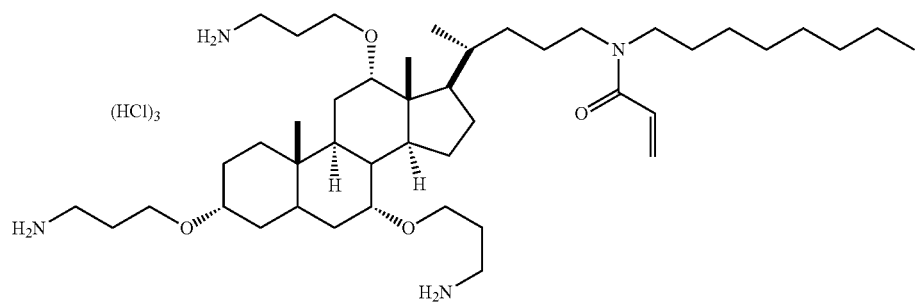

CSA-113

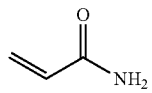

acrylamide

The amine-linking method of Scheme-III was also tried using a combination of CSA-109+acrylic acid, but the previous combination of CSA-113+acrylamide was found to polymerize more easily.

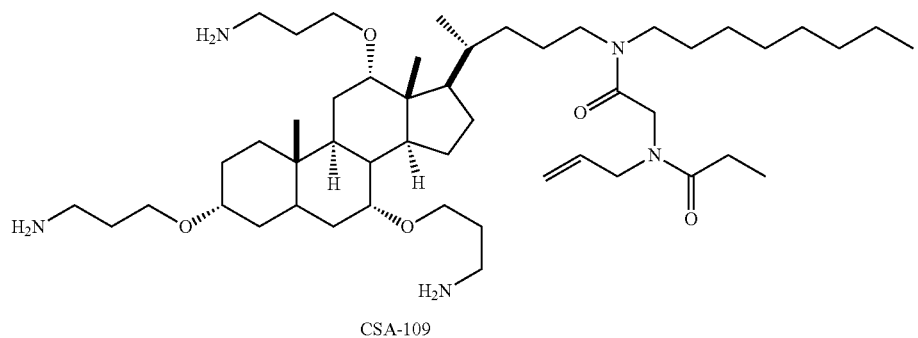

CSA-109

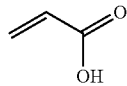

acrylic acid

Attachment Scheme-IV

A fourth attachment scheme (Scheme-IV) was developed, according to the present invention. Scheme-IV (also referred to as the "UV grafting method") can be used on any polymer surface, including membranes and spacers. However, the ultraviolet (UV) exposure can damage ultra-thin polyamide RO membranes. In the UV grafting method of attachment, brush-like copolymers are grown off of the substrate's surface, and the number of polymer chains is not limited by the number of free amines on the substrate's surface. The process begins with the deposition of a UV-absorbing photoinitiator (e.g., benzophenone) on a polymer substrate's surface (e.g., a polyamide membrane or LDPE spacer). The surface is then covered with an aqueous monomer solution of alkene-functionalized ceragenin (e.g. CSA-113), a comonomer (e.g., acrylamide), and a solvent (e.g., water). Then, a UV lamp is placed above the solution. Radicals are formed when the benzophenone molecules absorb the UV light. These radicals initiate the polymerization reaction at the substrate's surface. As with the previously described amine-linking method (Scheme-III), each copolymer chain may contain many ceragenin molecules. Compared to Scheme-III, the UV grafting method (Scheme-IV) has the potential to result in the attachment of more ceragenin molecules (although there is also the potential problem that UV exposure can damage a membrane made of polyamide).

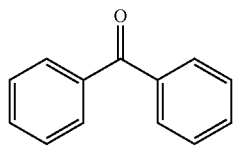

benzophenone

In general, attachment scheme-IV is a method of grafting alkene-functionalized ceragenins to a polymer substrate using ultraviolet light (UV), comprising, in the order listed: a) providing a polymer substrate with free amine groups; b) depositing a UV-absorbing photoinitiator on a surface of the polymer substrate; c) immersing the surface of the polymer substrate in a monomer solution comprising an alkene-functionalized ceragenin, a comonomer, and a solvent; d) exposing the monomer solution containing the substrate to UV light, thereby forming radicals that initiate a polymerization reaction; and e) forming ceragenin-containing copolymers that are attached to the polymer substrate via amine-linkages. The polymer substrate can be a polyamide or polyethylene substrate. The photoinitiator can be benzophenone. The alkene-functionalized (i.e., carbon-carbon double bond-functionalized) ceragenin can be CSA-113, CSA-109, or CSA- 120. In general, the comonomer can be an α,β-unsaturated carbonyl-type monomer. Some preferred comonomers include: acrylamide, acrylic acid, acrylonitrile, methyl acrylate, methyl methacrylate, and maleic anhydride. The solvent can be water. Preferably, the amine end groups on the ceragenin molecules are protonated (i.e., the ceragenin is in the salt form before making the monomer solution in step (c)).

In other embodiments of Attachment Scheme-IV, the monomer solution can comprise any well-known surfactant or wetting agent, such as poly(ethylene glycol), poly(propylene glycol), or poly(vinyl alcohol), to help improve wetting and surface coverage to the polymer substrate. Additionally, the aqueous monomer solution can further comprise a crosslinker (cross-linking agent), e.g., N,N'-ethylenebis(acrylamide), N,N'-propylbis(acrylamide), or 1,3-butadiene, to increase the size of the copolymer chains (and, hence, the number of ceragenin molecules incorporated) by introducing branched structures. Optionally, the polymer substrate can comprise a polyamide material, which can be a reverse-osmosis membrane with a thickness ranging from 100 to 200 nm, and where the membrane is attached to a micro-porous polysulfone supporting layer. Optionally, the ratio of the amount of alkene-functionalized ceragenin to the amount of comonomer in the monomer solution can be varied, depending on the desired amount of spacing between ceragenin molecules on the co-polymer chain. For example, the mole ratio of ceragenin-to-comonomer can range from as low as 1:50, to as high as 100% ceragenin with 0% comonomer.

A specific embodiment of the method of Scheme-IV, which uses a polyamide substrate, can be performed according to the following steps:
  a) soaking the polymer substrate in deionized water for 24 hours, and then soaking in ethanol (or methanol or isopropanol) for 5-10 minutes;
  b) soaking the substrate in a 10 mM solution of benzophenone in ethanol (or methanol or isopropanol) at room temperature for 1 hour, then removing and drying under vacuum;
  c) exposing a surface of the substrate to an aqueous monomer solution comprising alkene-functionalized ceragenin and acrylamide in water, wherein the mole fraction of ceragenin ranges from 2 to 100%, and the monomer concentration ranges from 0.01 to 1 M;
  d) covering the monomer solution (containing the substrate) with a quartz plate, and then directing UV radiation through the quartz plate for 1-60 minutes, thereby causing a polymerization reaction; and
  e) rinsing the substrate with water.

Example 2

Example 2 illustrates an example of using Attachment Scheme-IV to attach ceragenins to a polyamide membrane. A 1"×3" piece of polyamide RO membrane was pretreated by soaking in deionized water for 24 hours and then in ethanol for 5-10 minutes. Then it was soaked in a 10 mM solution of benzophenone in ethanol at room temperature for 1 hour, after which it was removed and dried under vacuum. Next the surface of the membrane was covered with an aqueous solution of CSA-113 (337 mg) and acrylamide (28 mg) in 8 mL water. The membrane and solution were covered with a quartz plate, and UV radiation (365 nm) was directed through the quartz plate for 30 minutes. Finally, the membrane was rinsed with water.

Attachment Scheme-V

Attachment scheme-V (also referred to as the "silane-coating method") can be used on any polymer substrate; and in particular on spacers or membranes (although an initial plasma treatment can damage ultra-thin polyamide membranes). In scheme-V, a very thin, silane-based coating (e.g., an aminosilane coating) is initially attached to a surface of the polymer substrate. The silane-based coating can be a single monolayer, a few monolayers, or a crosslinked network of siloxanes (e.g., poly(siloxane)) with a thickness up to 1 micron. The silane-based coating contains free amines that can be used as points of attachment for the ceragenin molecules in subsequent steps.

In Scheme-V, the substrate can be any polymer that can be plasma treated and oxidized, then coated with a silane coating. Those polymers can include polysulfones, polyesters, polycarbonates, and polyvinylchlorides. Scheme-V can also be used with polymer substrates that don't require a plasma treatment/oxidizing step, e.g., a hydroxyl-containing polymer, such as poly(vinyl alcohol); an epoxy resin; a poly(ester); or a polymer surface that has been plasma treated and oxidized to form hydroxyl groups on its surface (e.g., polyethylene that is oxidized with plasma treatment and air exposure). In other embodiments, the polymer substrate can be a polymer (e.g., a polyamide or polyethylene) that is coated with a layer comprising the hydroxyl-containing polymer, such as poly(vinyl alcohol).

Scheme-V can also be used for attaching ceragenins to porous water treatment membranes; and in particular, ultra-thin polyamide membranes used for reverse osmosis. Poly(siloxanes) are hydrophobic. So, we were initially very concerned that a putting a layer, even a very thin one, of this material on the surface of a water treatment membrane (any porous membrane) would reduce the amount of water that would penetrate the membrane at a given pressure (i.e., the flux). We were also concerned that the crosslinked nature of the proposed siloxane coatings could be another factor that would make the coating a barrier to water penetration. Unexpectedly, we discovered that use of silane-based coatings as intermediate bonding layers for attaching ceragenins was quite successful, and did not significantly reduce the amount of water that would penetrate the membrane at a given pressure (i.e., the flux), despite the silane-based coating's hydrophobic properties.

Figure 11:
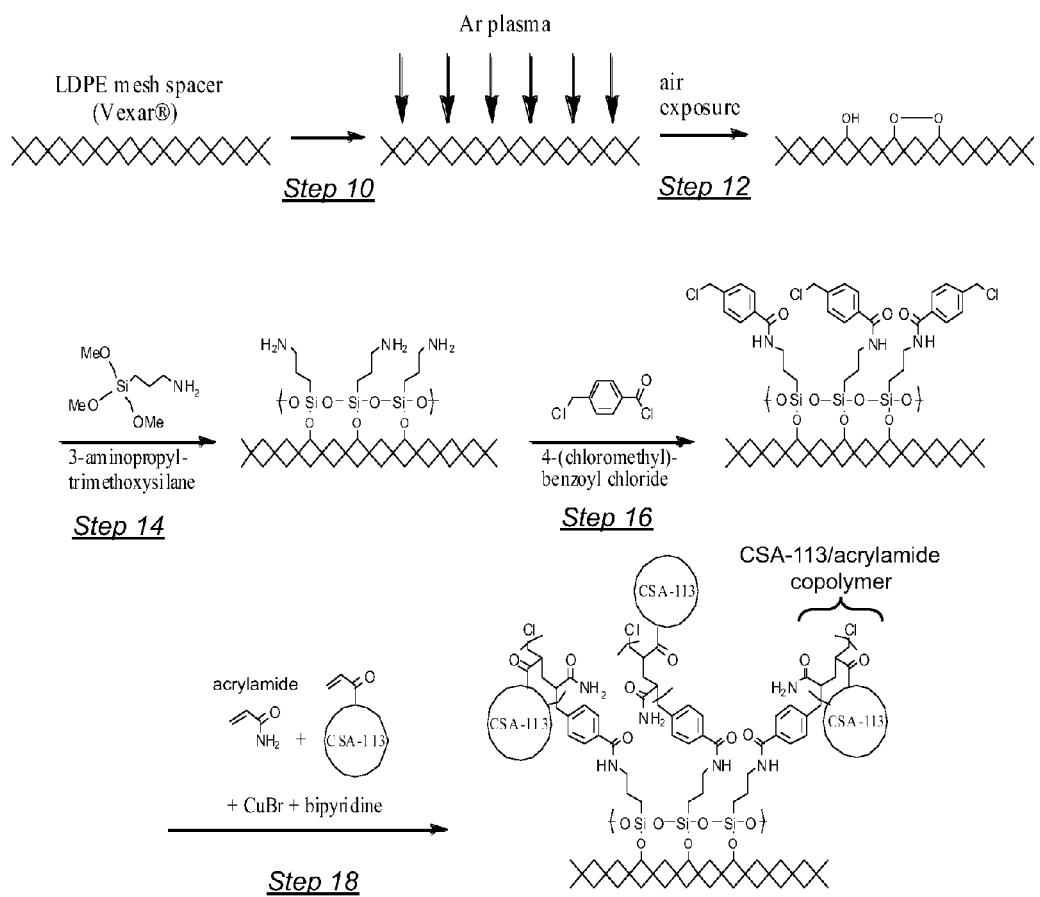
FIG. 11 shows an example of Attachment Scheme-V.

FIG. 11 schematically illustrates an embodiment of Attachment Scheme-V, according to the present invention. In step 10, a surface of the polymer substrate (e.g., a LDPE mesh spacer, Vexar®) is pre-treated by exposing the surface to a plasma (e.g., an argon/oxygen plasma). Then, in step 12, the plasma-treated surface is exposed to an oxidizing atmosphere (e.g., air), which oxidizes the surface. Pre-treatment steps 10 and 12 help prepare the substrate's surface for the subsequent aminosilanization step. Next, in step 14, the plasma-treated/oxidized surface is treated with a solution containing aminosilane molecules (e.g., 3-aminopropyltrimethoxysilane (APTMOS) or aminopropyltriethoxysilane (APTEOS)), which deposits a very thin coating comprising aminosilane molecules. The aminosilane molecules have at least one free amine end group that can covalently bond to oxygen atoms (e.g., in the form of hydroxyls or peroxides) at the oxidized surface. This creates an aminosilane-functionalized surface.

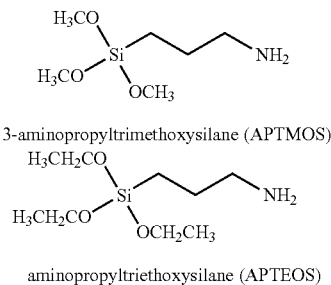

3-aminopropyltrimethoxysilane (APTMOS)

aminopropyltriethoxysilane (APTEOS)

Next, in step 16, the aminosilane-functionalized surface of the polymer substrate is treated with a Type-I compound. Type-I compounds can be acid halides with an attached halogen atom that can be abstracted to leave a stable radical. Preferred Type-I compounds can be 4-(chloromethyl)benzoyl chloride (CMBC) or bromoisobutyryl bromide. This attaches chlorobenzyl moieties to free amines on the silane coating (in an embodiment using CMBC). The chlorobenzyl groups function as atom-transfer radical polymerization (ATRP) initiators in a subsequent grafting reaction (step 18) that attaches ceragenin-containing copolymers to the silane-coated surface via amide and siloxane linkages, without the need to use UV light. In other words, step 16 creates an initiator-functionalized aminosilane coating, where the initiators are pre-attached to the aminosilane coating before the polymerization step. Then, in step 18, ceragenin-containing polymers are grown off of the surface by an ATRP reaction, which does not require UV light.

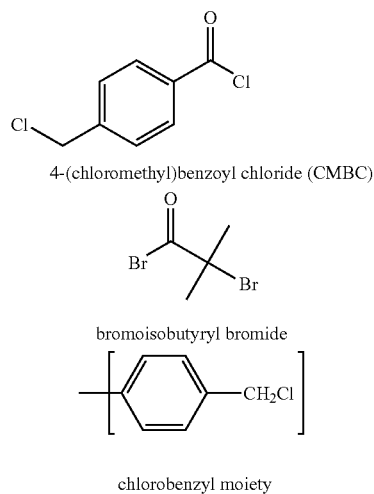

4-(chloromethyl)benzoyl chloride (CMBC)

bromoisobutyryl bromide chlorobenzyl moiety

The result of step 18 are ceragenin-containing copolymer reaction products that are chemically grafted to the surface of the polymer substrate via amide and siloxane linkages. The ceragenin-containing copolymer reaction products can form as brush-like structures extending away from the surface of the substrate. Using the ATRP polymerization process (e.g., steps 16-18) creates a "living" polymer, beginning with a primary amine that is covalently linked to the polymer substrate using siloxanes. Living polymerizations have no inherent termination step, so the polymer is still reactive even after all of the initial source monomer has been used up. This is a useful feature, since it is easy to endcap these polymers with specific groups, or to make block copolymers by adding different monomers in successive steps.

Alternatively, a Type-II compound can be used in place of the Type-I compound in step 16. Type-II compounds can be acid halides or anhydrides with pendant alkenes. Some examples of Type-II compounds include: maleic anhydride, and Compounds A and B shown below. In Compound B the vinyl group can be ortho, meta, or para, relative to the acid chloride group. A preferred example of a Type-II compound is acryloyl chloride. After step 16, this leaves acrylamide moieties (instead of chlorobenzyl moieties) attached to the free amines on the aminosilane coating. The acrylamide groups can then participate in a UV-initiated grafting reaction, which attaches ceragenin-containing copolymer reaction products to the aminosilane-coated surface via amide and siloxane linkages.

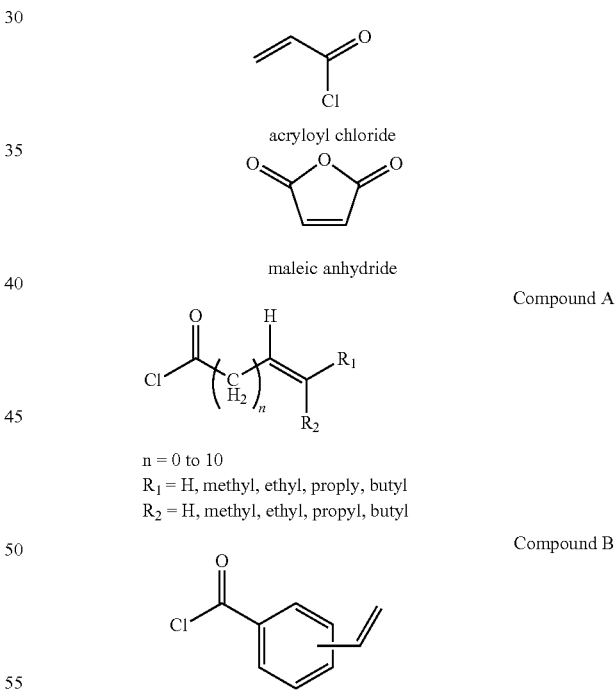

acryloyl chloride maleic anhydride

Compound A n = 0 to 10
R$_1$ = H, methyl, ethyl, proply, butyl
R$_2$ = H, methyl, ethyl, propyl, butyl Compound B Where the vinyl group can be ortho, meta, or para, relative to the acid chloride group In attachment Scheme-V, the alkene-functionalized ceragenin can be CSA-105, CSA-113, CSA-109, or CSA-120. In general, the comonomer can be an α,β-unsaturated carbonyl-type monomer. Some preferred comonomers include: acrylamide, acrylic acid, acrylonitrile, methyl acrylate, methyl methacrylate, and maleic anhydride. The solvent can be water. Optionally, the monomer solution can comprise any well-known surfactant or wetting agent, such as poly(ethylene glycol), polypropylene glycol), or polyvinyl alcohol), to help improve wetting and surface coverage to the polymer substrate. Additionally, the aqueous monomer solution can further comprise a crosslinker (cross-linking agent), e.g., N,N'-ethylenebis(acrylamide), N,N'-propylbis(acrylamide), or 1,3-butadiene, to increase the size of the copolymer chains (and, hence, the number of ceragenin molecules incorporated) by introducing branched structures.

A first specific embodiment of the method of Scheme-V, which uses a polyethylene substrate (e.g., a LDPE spacer), can be performed according to the following steps:

a) exposing the polyethylene spacer to an argon/oxygen plasma for 1-10 minutes, followed by exposing the spacer to air for about 10 minutes;
b) immersing the spacer in a solution of 3-aminopropyltrimethoxysilane (APTMOS) in toluene (1 to 10 wt %) for 90 minutes at room temperature;
c) rinsing the spacer with toluene and then with ethanol;
d) exposing the surface of the spacer to a solution of 4-(chloromethyl)benzoyl chloride (CMBC) or acryloyl chloride in dichloromethane (1 to 10 wt %), followed by heating the solution to reflux temperature for 20 minutes, then removing and washing the spacer with dichloromethane, and drying in air at room temperature;
e) immersing the spacer in a monomer solution comprising CSA-113 ceragenin and acrylamide, wherein the mole fraction of ceragenin ranges from 2 to 100%, and the monomer concentration ranges from 0.01 to 1 M;
f) removing the spacer from the monomer solution (without rinsing or washing), and placing the spacer under a UV lamp (365 nm) for 15 minutes, and then turning over and allowing to sit under the UV lamp for another 15 minutes;
g) forming ceragenin-containing copolymer reaction products that are chemically grafted to the surface of the polymer substrate via amide and siloxane linkages; and
h) rinsing the spacer with ethanol.

A second specific embodiment of the method of Scheme-V, which uses a polyethylene substrate (e.g., a LDPE spacer), can be performed according to the following steps:

a) exposing the polyethylene spacer to an argon/oxygen plasma for 1-10 minutes, followed by exposing the spacer to air for about 10 minutes;
b) immersing the spacer in a solution of 3-aminopropyltrimethoxysilane (APTMOS) in toluene (1 to 10 wt %) for 90 minutes at room temperature;
c) rinsing the spacer with toluene and then with ethanol;
d) exposing the surface of the spacer to a solution of 4-(chloromethyl)benzoyl chloride (CMBC) in dichloromethane (1 to 10 wt %), followed by heating the solution to reflux temperature for 20 minutes, then removing and washing the spacer with dichloromethane, and drying in air at room temperature;
e) immersing the spacer in a monomer solution comprising CSA-113 ceragenin and acrylamide, wherein the mole fraction of ceragenin ranges from 2% to 100%, and the monomer concentration ranges from 0.01 to 1 M;
f) adding a copper-based catalyst (e.g., copper(I) bromide) (1-25 weight % based on mass of monomers) and a nitrogen-based ligand (e.g., 2,2'-bipyridine) (1-25 weight % based on mass of monomers) to the monomer solution, thereby initiating an atom-transfer radical polymerization (ATRP) reaction;
g) allowing the polymerization reaction to proceed for 1 hour at room temperature;
h) forming ceragenin-containing copolymer reaction products that are chemically grafted to the surface of the polymer substrate via amide and siloxane linkages; and
i) rinsing the spacer with ethanol;

wherein no UV light is required to initiate the polymerization reaction.

Example 3

Example 3 illustrates a first example of using Attachment Scheme-V to attach ceragenins to a Vexar® spacer. A 1.5"×3.5" piece of Vexar® (LDPE) spacer was pre-treated with an argon/oxygen plasma for 2 minutes. The spacer was exposed to air for about 10 minutes and was then immersed in a 2% solution of 3-aminopropyltrimethoxysilane (APTMOS) in toluene for 90 minutes at room temperature. After rinsing with toluene and then with ethanol, the spacer was immersed in a 1.5 wt. % solution of CMBC (or alternatively, acryloyl chloride) in dichloromethane. The reaction was heated to reflux temperature for 20 minutes. The spacer was then washed with dichloromethane and dried in air at room temperature. The spacer was then dipped into a solution of CSA-113 (1.22 g) and acrylamide (0.094 g) in a water:methanol (1:1, 20 mL, degassed). After removing it from the monomer solution (without rinsing or washing), the spacer was placed under a UV lamp (365 nm) for 15 minutes. Then it was turned over and allowed to sit under the UV lamp for another 15 minutes. Finally, the spacer was rinsed thoroughly with ethanol.

Example 4

Example 4 illustrates a second example of using Attachment Scheme-V to attach ceragenins to a Vexar® spacer. A 1.5"×3.5" piece of Vexar® spacer was pretreated with an argon/oxygen plasma for 2 minutes. The spacer was exposed to air for about minutes and was then immersed in a 2% solution of 3-aminopropyltrimethoxysilane (APTMOS) in toluene for 90 minutes at room temperature. After rinsing with toluene and then with ethanol, the spacer was immersed in a 1.5 wt. % solution of CMBC in dichloromethane. The reaction was heated to reflux temperature for 20 minutes. The spacer was then washed with dichloromethane and dried in air at room temperature. The spacer was immersed in a solution of CSA-113 (1.22 g) and acrylamide (0.094 g) in a water:methanol (1:1, 20 mL, degassed). Copper(I) bromide (100 mg) and 2,2'-bipyridine (109 mg) were added and the reaction was covered and allowed to proceed at room temperature for 1 hour. Finally, the spacer was rinsed thoroughly with ethanol and water.

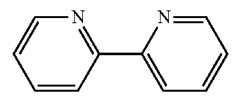

2,2'-bipyridine

Example 5

Example 5 illustrates an example of using Attachment Scheme-V to attach ceragenins to a polyamide RO membrane. The surface of a 1"×3" piece of RO membrane was exposed to a 2 wt. % solution of 3-aminopropyltrimethoxysilane (APTMOS) in isopropanol for 90 minutes at room temperature. After rinsing with ethanol, the surface of the membrane was exposed to a solution of HCl (0.01 M) for 1 hour, followed by a solution of $Na_2CO_3$ (1 wt. % in water) for 18 hours, followed by water for at least 1 h, followed by ethanol for at least 1 hour. Next, the surface of the membrane was exposed to a 1.5 wt. % solution of CMBC in ethanol for 4.5 hours. The membrane was then immersed in ethanol briefly, then in a solution of $Na_2CO_3$ (1 wt. % in water) for 18 hours, followed by water for at least 1 h, followed by ethanol for at least 1 hour. Next, the surface of the membrane was exposed again (for a second time) to a 1.5 wt. % solution of CMBC in ethanol for 4.5 hours. The membrane was then immersed in ethanol briefly, followed by water for at least 1 hour. Next, the surface of the membrane was exposed to a solution of CSA-113 (1.22 g) and acrylamide (0.094 g) in a water:methanol solvent (1:1, 20 mL, degassed). Copper(I) bromide (100 mg) and bipyridine (109 mg) were added, and the reaction was covered and allowed to proceed at room temperature for 5 hours. Finally, the membrane was rinsed thoroughly with ethanol and water. Note: no UV light or plasma treatment was used in this example.

In Example 5, the reason for repeating the step of exposing the surface to the 1.5 wt % solution of CMBC in ethanol is as follows. When an amine reacts with an acid chloride (a functional group on CMBC) the products are an amide and HCl. The HCl is a byproduct but it can react with an amine to form an ammonium salt. The ammonium salt can't react with an acid chloride, so that amine has been deactivated and the potential number of amides that can be formed is reduced. Since one HCl is formed for each amide formed, only half of the surface amines can be used. In order to mitigate this problem, the substrate is treated with a base (e.g., $Na_2CO_3$) to turn the ammoniums back into amines, and then the surface is treated with more CMBC. Of course, this would only allow 75% of the surface amines to be used; but one could repeat the steps several times in order to push the fraction closer to 100%.

In Examples 3, 4, and 5, a copper-based copper(I) bromide catalyst and a nitrogen-based bipyridine ligand are added to the monomer solution in order to initiate the atom-transfer radical polymerization (ATRP) reaction. The copper-based catalyst and the nitrogen-containing ligand combine to form a catalyst complex. In general, for attachment scheme-V, other copper-based catalysts and other ligands can be substituted for copper(I) bromide and bipyridine, respectively, can be combined to form catalyst complexes that perform the same function as copper(I) bromide and bipyridine (i.e., to initiate the atom-transfer radical polymerization (ATRP) reaction). The source of copper (I) can be, for example: CuCl, CuBr, CuI, $CuCO_2CH_3$, or CuCN. One could also use a copper (II) compound (such as: $CuCl_2$, $CuBr_2$ or $CuI_2$, $CuF_2$, $CuSO_4$, $Cu(CO_2CH_3)_2$, $Cu(OH)_2$), and then add a reducing agent like ascorbic acid to reduce the Cu(II) to Cu(I) in-situ. ATRP chemistry is widely used and other catalysts may be used.

Recent reviews on the structural aspects of copper catalyzed ATRP(1-3) provide some background on the fundamentals of transition metal catalyzed atom transfer reactions, including ATRA and ATRP. The catalyst complex can be formed with bidentate, tridentate or tetradentate nitrogen ligands. The primary roles of a ligand added to an ATRP are to solubilize the Cu salts, and to tune the Cu catalyst activity to optimally conduct a well-controlled polymerization. Nitrogen-based ligands generally work well for Cu-mediated ATRP. The choice of ligand greatly influences the effectiveness of the catalyst in a specific polymerization reaction. One ligand does not work for every copolymerization, since catalyst activity span seven orders of magnitude. A broad series of ligands forming catalyst complexes, with an expansive range of activity, can be used for Attachment Scheme-V, including:

2,2'-bipyridine (bpy),
4,4'-di(5-nonyl)-2,2'-bipyridine (dNbpy),
N,N,N',N'-tetramethylethylenediamine (TMEDA),
N-propyl(2-pyridyl)methanimine (NPrPMI),
2,2':6',2"-terpyridine (tpy),
4,4',4"-tris(5-nonyl)-2,2':6',2"-terpyridine (tNtpy),
N,N,N',N",N"-pentamethyldiethylenetriamine (PMDETA),
N,N-bis(2-pyridylmethyl)octylamine (BPMOA),
1,1,4,7,10,10-hexamethyltriethylenetetramine (HMTETA),
tris[2-(dimethylamino)ethyl]amine (Me6TREN),
tris[(2-pyridyl)methyl]amine (TPMA),
1,4,8,11-tetraaza-1,4,8,11-tetramethylcyclotetradecane (Me4CYCLAM) and
N,N,N',N'-tetrakis(2-pyridylmethyl)ethylenediamine (TPEN)

Copper$^I$ and copper$^{II}$ complexes can be used with the following ligands to initiate ATRP reactions:

| | |
|---|---|
| diethylenetriamine | (DETA), |
| triethylenetetramine | (TETA), |
| N,N-bis(2-pyridylmethyl)amine | (BPMA), |
| tris[2-aminoethyl]amine | (TREN), |
| 1,4,8,11-tetraazacyclotetradecane | (CYCLAM), and |
| N,N,N',N'-tetrakis(2-pyridylmethyl)ethylenediamine | (TPEN). |

Figure 19:
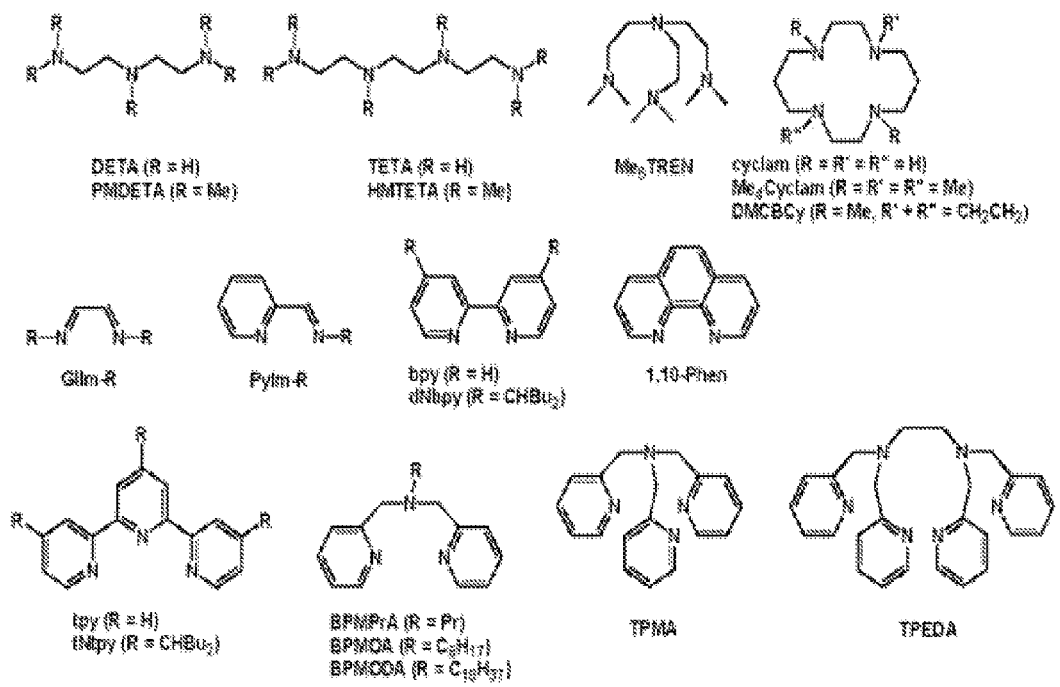
FIG. 19 shows examples of ligands that can be used with copper-based catalysts for ATRP reactions.

Some ligands that can be employed with copper-based catalysts for ATRP reactions are shown in FIG. 19.

With respect to Scheme-V, it was initially thought that applying a silane-based coating (e.g., APTMOS) to a polyamide RO membrane would cause a significant reduction in the flux of liquid passing through the membrane; as well as degrading the ability of the membrane to reject salt. However, it was discovered, unexpectedly, during the development of the present invention that application of a silane-based coating (e.g., APTMOS) to a polyamide RO membrane did not cause a significant reduction in the flux of liquid passing through the membrane; as well as not degrading the ability of the membrane to reject salt.

Figure 12:
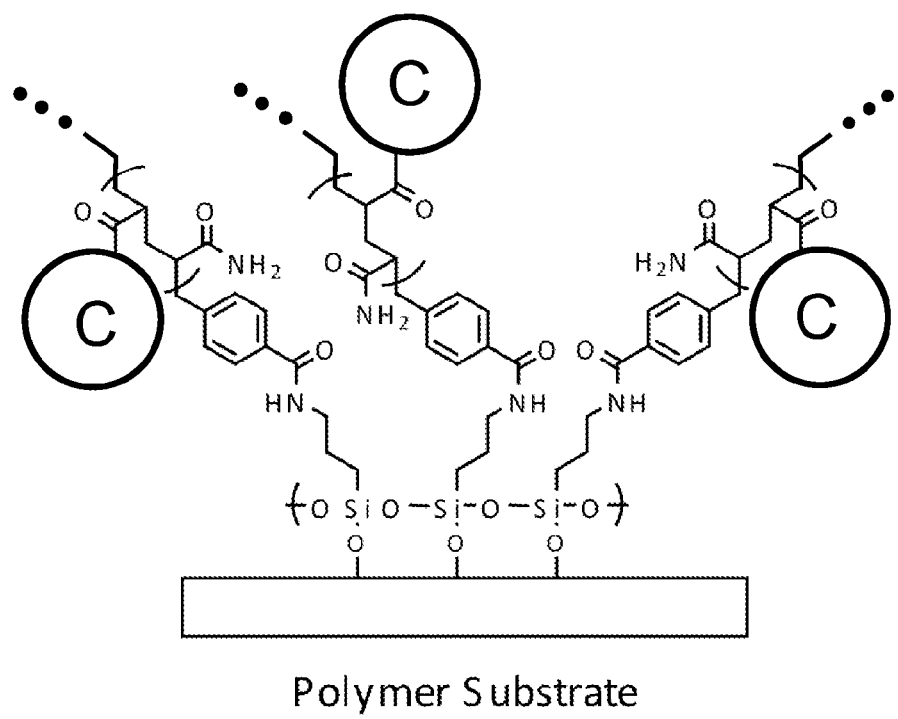
FIG. 12 shows the chemical structure of Structure-II.

FIG. 12 schematically illustrates a second example of a simplified structure of a biofouling-resistant reaction product (i.e., Structure-II), which can be made according to Scheme-V. FIG. 12 shows a polymer substrate with a crosslinked siloxane-coated surface. Brush-like acrylamide/ceragenin copolymer chains are grafted to amines extending off from each siloxane group. The ceragenin "C" in Structure-II can be any alkene-functionalized ceragenin. In particular, the ceragenin "C" can be CSA-105, CSA-109, CSA-113, or CSA-120. Structure-II is an example of a "living polymer", where the distal end of each copolymer chain can be uncapped. Living polymerizations have no inherent termination step, so the polymer is still reactive even after all of the initial source monomer has been used up. Alternatively, the free ends can be capped with, for example, a chlorine atom (not shown).

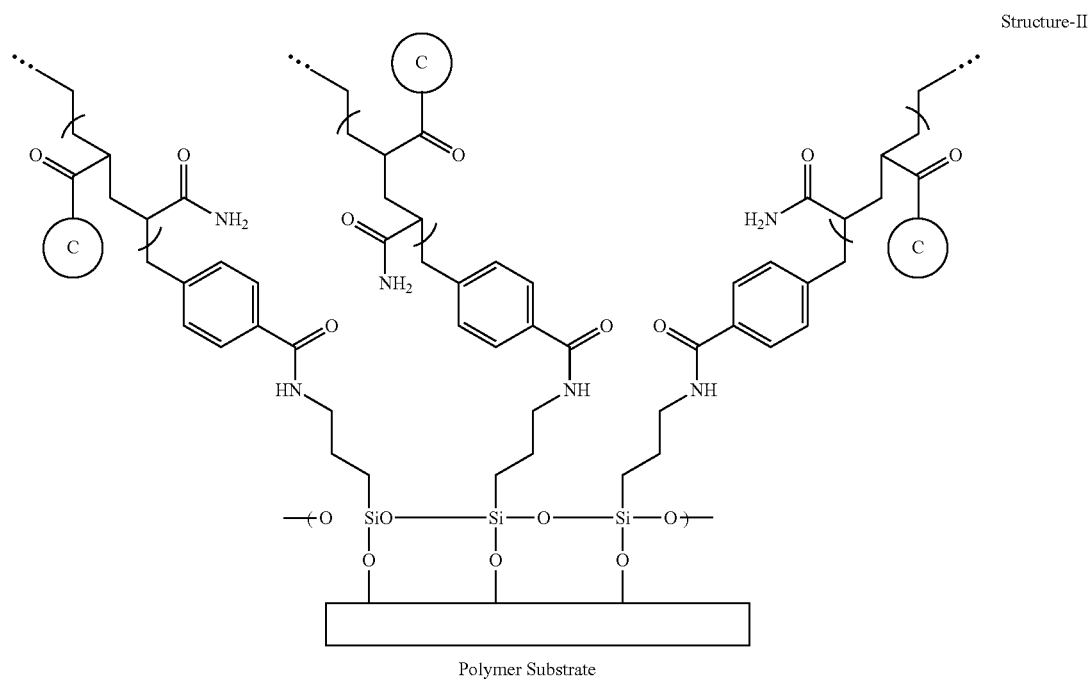

Structure-II

As with the amine-linking and UV-grafting methods previously described, each one of the copolymer chains in attachment scheme-V can contain many ceragenin molecules. The silane-coating method (Scheme-V) has the potential to result in the attachment of more ceragenin molecules, without the potential problem of UV damage to polyamide RO membranes.

Attachment Scheme-VI

A sixth attachment scheme (Scheme-VI) was developed, according to the present invention. This method does not involve attaching polymers to the surface of the membrane. Instead, this method (which is called the "direct attachment" method) attaches a single ceragenin (e.g., CSA-111) directly to free amines on the substrate's surface. As with the amine-linking method, this method shouldn't work on the spacers, since the spacers shouldn't have any amines on the surface (unless they are treated with APTMOS, or other aminosilane coatings, to provide free surface amines). CSA-111 has an amine-reactive N-hydroxysuccinimide group that reacts with a free amine on the surface of the RO membrane to form an amide linkage. The amines on CSA-111 are protected with 9-fluorenylmethyl carbamate (Fmoc) groups to prevent the CSA-111 from reacting with itself. Thus, after the attachment, the Fmoc groups need to be removed by treatment with a base, such as piperidine. This method is the simplest, most direct way of attaching ceragenins to membranes. It generally allows for one ceragenin to be attached per free amine on the surface, so the concentration of ceragenin may not be high enough to prevent biofouling. Also the mobility of the ceragenins attached this way is limited, possibly compromising the anti-bacterial activity of the ceragenins.

An embodiment of the method of Scheme-VI, which uses a polyamide membrane, can be performed according to the following steps:

a) providing a polyamide substrate with free amine groups;
b) attaching an N-hydroxysuccinimide-functionalized ceragenin to the free amine groups;
c) forming a layer of ceragenin molecules that are attached to the polyamide substrate via amide-linkages.

Example 5

Example 5 illustrates an example of using Attachment Scheme-VI to attach ceragenins to a polyamide membrane. A 1"×3" piece of RO membrane was pretreated by soaking in a 5% solution of sodium bicarbonate (aqueous) for 1-2 hours. Then it was rinsed with water, dipped briefly into ethanol, and then the surface was treated with a solution of CSA-111 (30 mg) and triethylamine (5 drops) in 9 mL of ethanol. The reaction was covered and heated to 45° C. for 22 hours. The membrane was rinsed with ethanol, and then soaked in a 3:1 v/v solution of ethanol/piperidine for 6 hours. Finally the membrane was rinsed thoroughly with ethanol and then water.

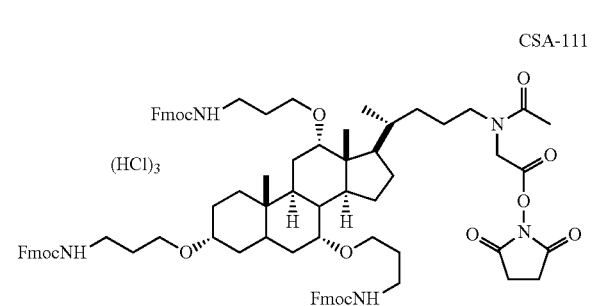

CSA-111

In general, in any of the attachment schemes described herein (Schemes I-VIII), the attachment can be optimized by varying the concentration and the ratio of the monomers; as well as the time that the membrane is exposed to the polymerization reaction. Also, in general, any polymer substrate, including polyamide RO membranes and LDPE spacers, can be treated with APTMOS, or other silane containing substances, to provide free amines on the substrate's surface.

Alternatively, or additionally, in any of the attachment schemes described (Schemes I through VI) described above, a crosslinker can be added to any of the polymerization steps described above to increase the size of the polymer chains (and hence, the number of ceragenin molecules incorporated) by introducing branched structures. Examples of suitable cross-linking agents (i.e., crosslinkers) include, but are not limited to: N,N'-ethylenebis(acrylamide), N,N'-propylbis (acrylamide), and 1,3-butadiene.

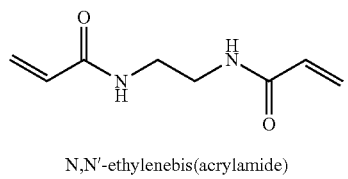

N,N'-ethylenebis(acrylamide)

Figure 13A:
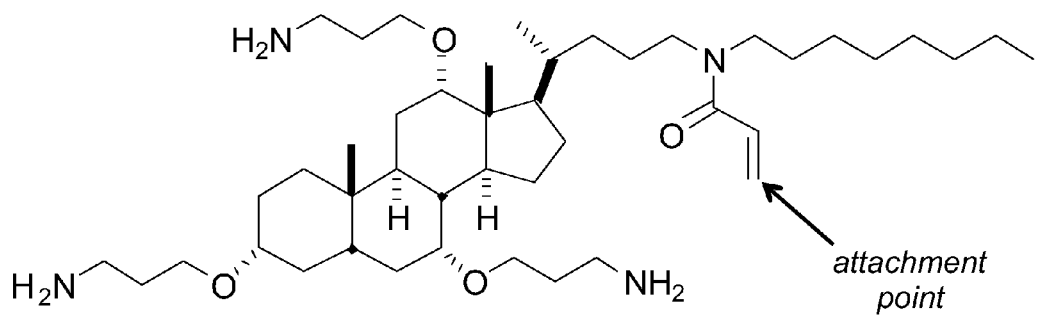
FIG. 13A shows the chemical structure of CSA-113 molecules attached to a polymer backbone.
Figure 13A:
Figure 13A:
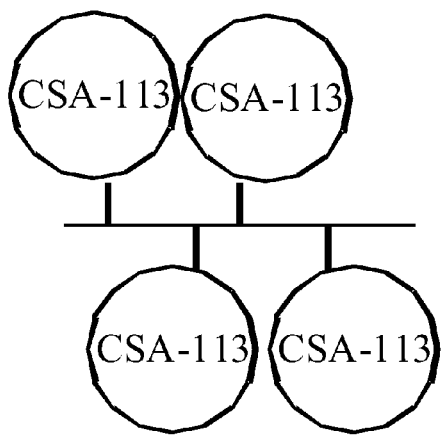

FIG. 13A shows an example of a biofouling-resistant structure, comprising a polymer backbone with ceragenin molecules attached to the backbone. In this example, CSA-113 ceragenin is attached via an attachment point that has a short linkage to the ceragenin's core. The short linkage reduces the flexibility and mobility of the polymerized ceragenins.

Figure 13B:
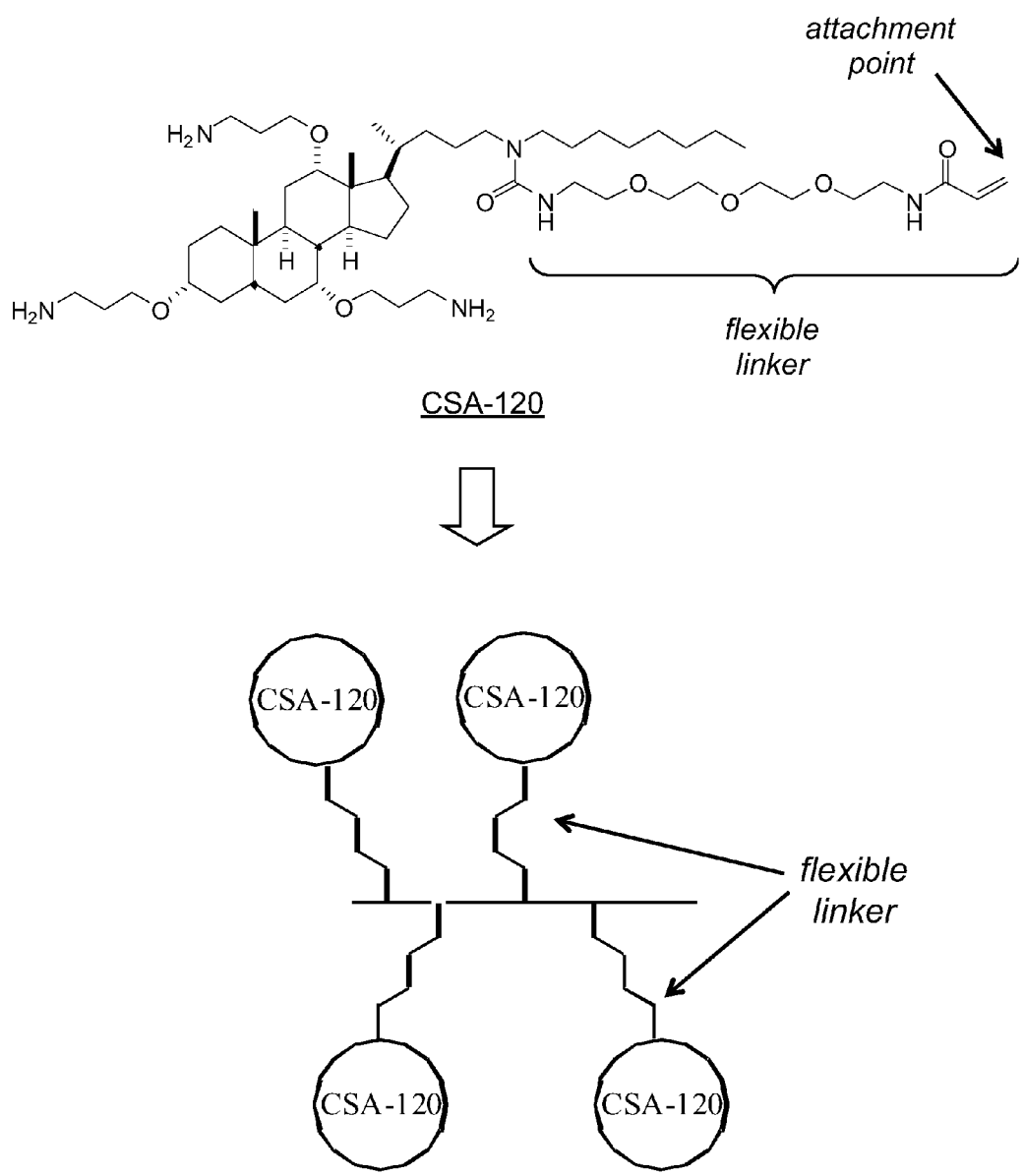
FIG. 13B shows the chemical structure of CSA-120 molecules attached with a flexible linker to a polymer backbone.

FIG. 13B shows a different example of a biofouling-resistant structure, comprising a polymer backbone with ceragenin molecules attached to the backbone. In this example, CSA-120 ceragenin is attached via an attachment point that has a much longer linkage to the ceragenin's core. This flexible linker significantly increases the flexibility and mobility of the polymerized ceragenins.

In laboratory tests of ceragenin coatings on silicone coupons, the polymerized CSA-113 coating showed a 1-log reduction of living organisms in the biofilm. In contrast, the more flexible/mobile polymerized CSA-120 ceragenin coating was much more effective, with no evidence of any biofilm formation.

Figure 14A:
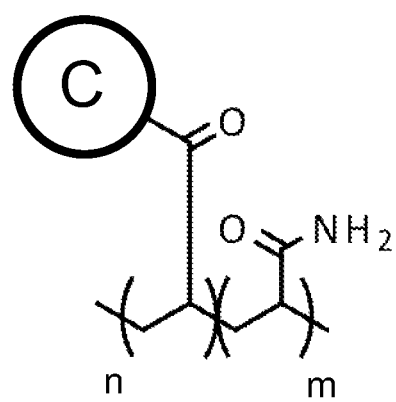
FIG. 14A shows the chemical structure of a first example of a ceragenin-containing copolymer composition, Composition-I, according to the present invention.

FIG. 14A shows the chemical structure of a first example of a ceragenin-containing copolymer composition (Composition-I) according to the present invention. Composition-I is a random copolymer of a ceragenin and acrylamide. The number of repeat units, m and n, can be the same, or different, depending on the relative concentrations of ceragenin monomer and acrylamide comonomer used in the attachment scheme. For example, the mole ratio of ceragenin-to-comonomer can range from as low as 1:50, to as high as 100% ceragenin with 0% comonomer. The ceragenin "C" in Composition-I can be any alkene-functionalized ceragenin. In particular, the ceragenin "C" can be CSA-105, CSA-109, CSA-113, or CSA-120.

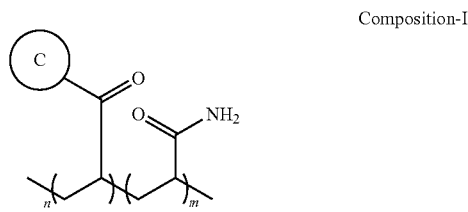

Figure 14B:
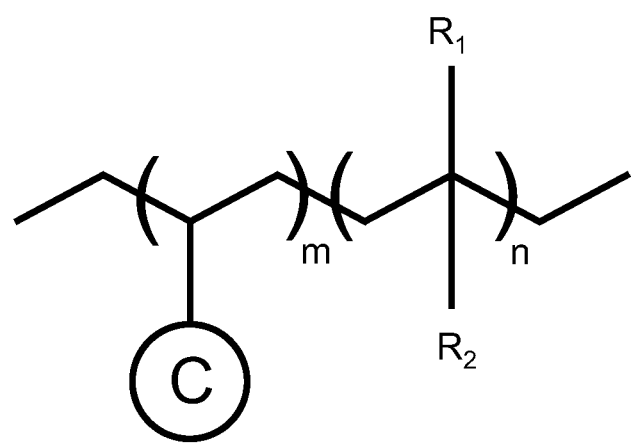
FIG. 14B shows the chemical structure of a second example of a ceragenin-containing copolymer composition, Composition-II, according to the present invention.

FIG. 14B shows the chemical structure of a second example of a ceragenin-containing copolymer composition (Composition-II) according to the present invention. Composition-II comprises a copolymer of an alkene-functionalized ceragenin and a comonomer with attached radicals $R_1$ and $R_2$. In a first grouping, $R_1$=COOH, CONH$_2$, CCN, or CO$_2$CH$_3$, and $R_2$=H. In a second grouping, $R_1$=CO$_2$CH$_3$ and $R_2$=CH$_3$. The number of repeat units, m and n, can be the same, or different, depending on the relative concentrations of ceragenin monomer and comonomer used in the attachment scheme. For example, the mole ratio of ceragenin-to-comonomer can range from as low as 1:50, to as high as 100% ceragenin with 0% comonomer. The ceragenin "C" in Composition-II can be any alkene-functionalized ceragenin. In particular, the ceragenin "C" can be CSA-105, CSA-109, CSA-113, or CSA-120.

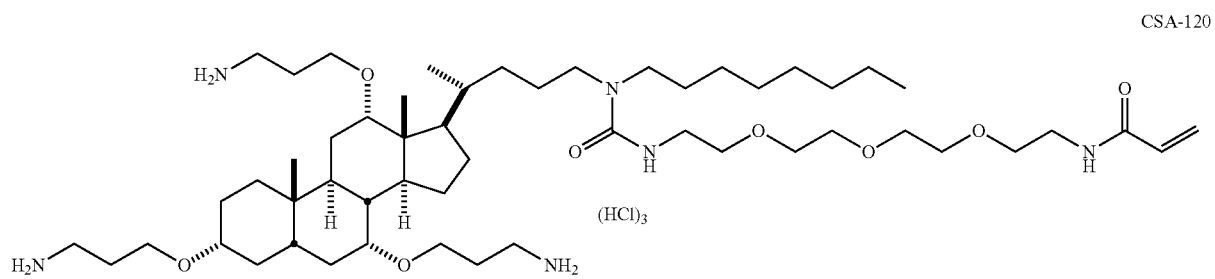

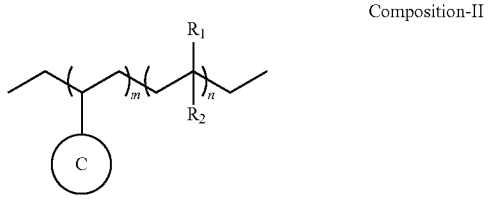

Figure 15A:
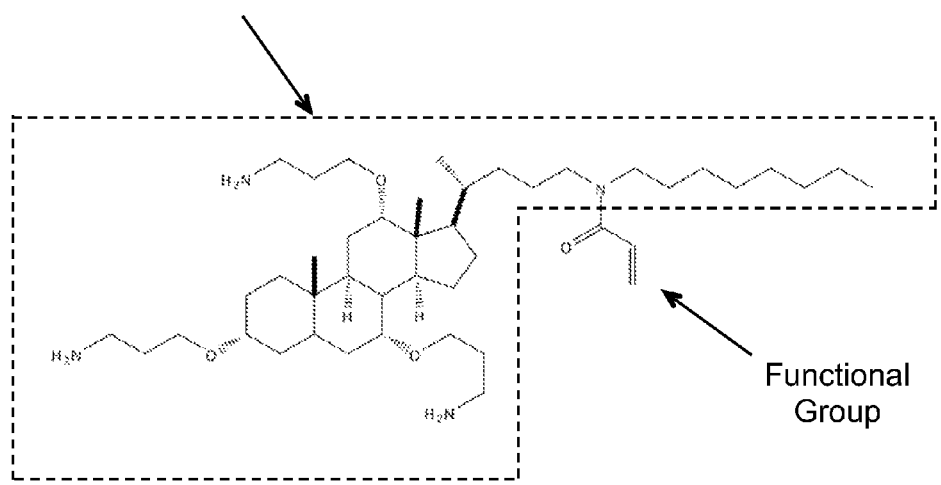
FIG. 15A shows the chemical structure of CSA-113 ceragenin, which is made up of a Core Ceragenin Structure plus a Functional Group.
Figure 15B:
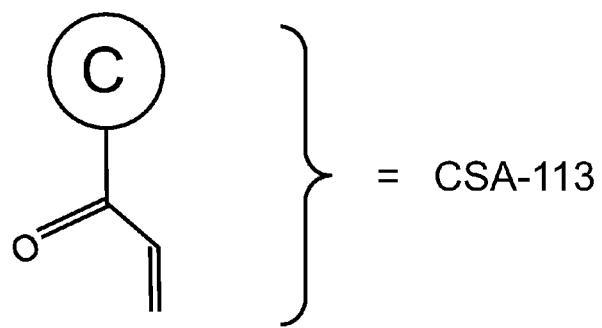
FIG. 15B shows a chemical structure for CSA-113, using a simplified notation.
Figure 16:
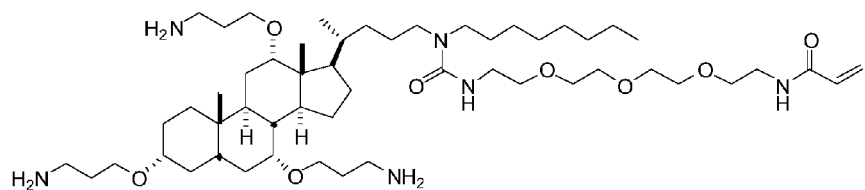
FIG. 16 shows the chemical structures of CSA-120, CSA-121, and CSA-122.
Figure 16:
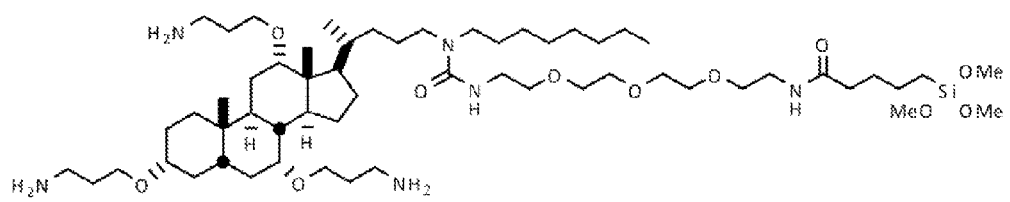
Figure 16:
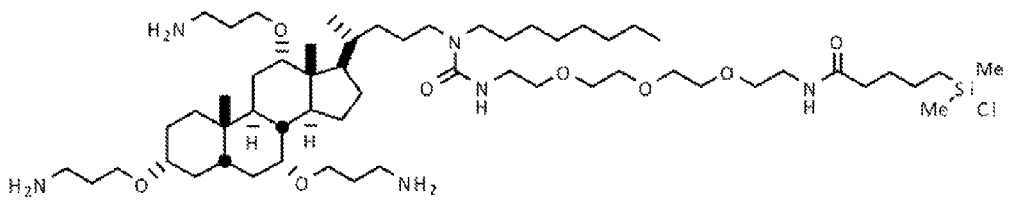

FIG. 15A shows the chemical structure of a preferred ceragenin, CSA-113, which is a polymerizable ceragenin. Polymerizable ceragenins comprise two parts: (1) a core ceragenin structure and (2) a functional group(s). Functional groups added to the core ceragenin structure make the ceragenin molecule polymerizable. FIG. 15B shows a chemical structure for CSA-113 using a simplified notation, where the circle with the letter "C" inside designates the core ceragenin structure (i.e., the dashed line box outline shown in FIG. 15A). Note that the instant definition of the term "core ceragenin structure" (as defined in FIG. 15A) is not the same as earlier reference to a "steroid core". The previous reference to a "steroid core" refers just to the four linked carbon rings that make up the rigid androstane core.

Attachment Scheme-VII

Figure 17:
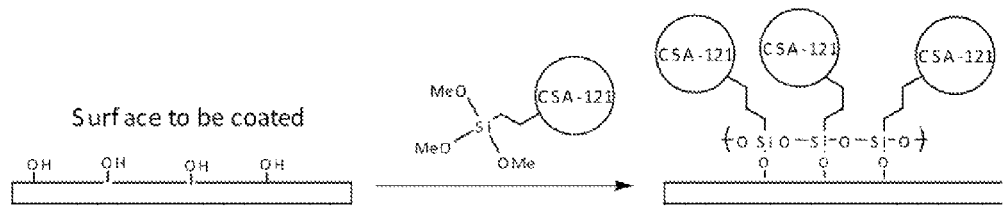
FIG. 17 shows an example of Attachment Scheme-VII.

A seventh attachment scheme (Scheme-VII) was developed, according to the present invention. FIG. 17 shows an example of steps for performing attachment scheme VII. This is a method of attaching silane-functionalized ceragenins to a substrate that has free hydroxyl groups on its surface (i.e., a hydroxyl-functionalized surface), comprising, in the order listed: a) providing a substrate with free hydroxyl groups on the surface, and b) attaching silane-functionalized ceragenins to the free hydroxyl groups; thereby c) forming a layer of ceragenins that are attached to the surface of the substrate via siloxane linkages. The substrate can be a polymer substrate that comprises: a hydroxyl-containing polymer, such as poly(vinyl alcohol); an epoxy resin; a poly(ester); or a polymer surface that has been oxidized to form hydroxyl groups on its surface (e.g., polyethylene that is oxidized with plasma treatment and air exposure). In some embodiments, the polymer substrate can be a polymer (e.g., a polyamide or polyethylene) that is coated with a layer comprising the hydroxyl-containing polymer, such as poly(vinyl alcohol). The silane-functionalized ceragenin can be any ceragenin molecule modified to have at least one reactive silane functional group, for example, CSA-121 or CSA-122. The amines on the ceragenin are preferably protonated, i.e. the ceragenin is in salt form. The grafted layer of silane-functionalized ceragenins can comprise a single monolayer of siloxane, or a crosslinked siloxane network with a thickness of up to 1 micron.

Attachment Scheme-VIII

Figure 18:
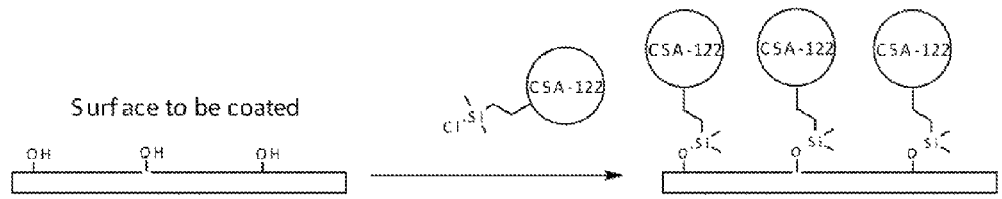
FIG. 18 shows an example of Attachment Scheme-VIII.

Attachment Scheme-VIII is similar to Scheme-VII. FIG. 18 shows an example of steps for performing attachment scheme VII. After attaching, the silane-groups on the ceragenins can form a single monolayer of ceragenins directly attached to the substrate via a silane-linkage.

Note that both Scheme-VII and Scheme-VIII do not require the use of UV light or initiator catalysts to attach the ceragenins.

Example 6

Example 6 illustrates an example of using either Attachment Scheme-VII or VIII to attach ceragenins to a polymer substrate; comprising, in the order listed:
  a) exposing a surface of a polymer substrate to an argon/oxygen plasma for 1 to 10 minutes, followed by exposing the surface to air for about 10 minutes, thereby oxidizing the surface;
  b) contacting the oxidized surface of the substrate with a monomer solution of CSA-121 (or CSA-122) in ethanol (or methanol or isopropanol) (1 to 10 weight %) for 10 to 100 minutes at 20-50° C.; and
  c) rinsing the surface with ethanol (or methanol or isopropanol);
  d) thereby forming a layer of ceragenin molecules that are attached to the surface of the substrate via siloxane linkages.

A second example of steps for performing attachment Schemes VII or VIII can comprise, in the order listed:
  a) applying a coating of poly(vinyl alcohol) to a reverse osmosis membrane;
  a) contacting the poly(vinyl alcohol)-coated surface of the reverse osmosis membrane with a monomer solution of CSA-121 (or CSA-122) in ethanol (or methanol or isopropanol) (1 to 10 weight %) for 10 to 100 minutes at 20-50° C.; and

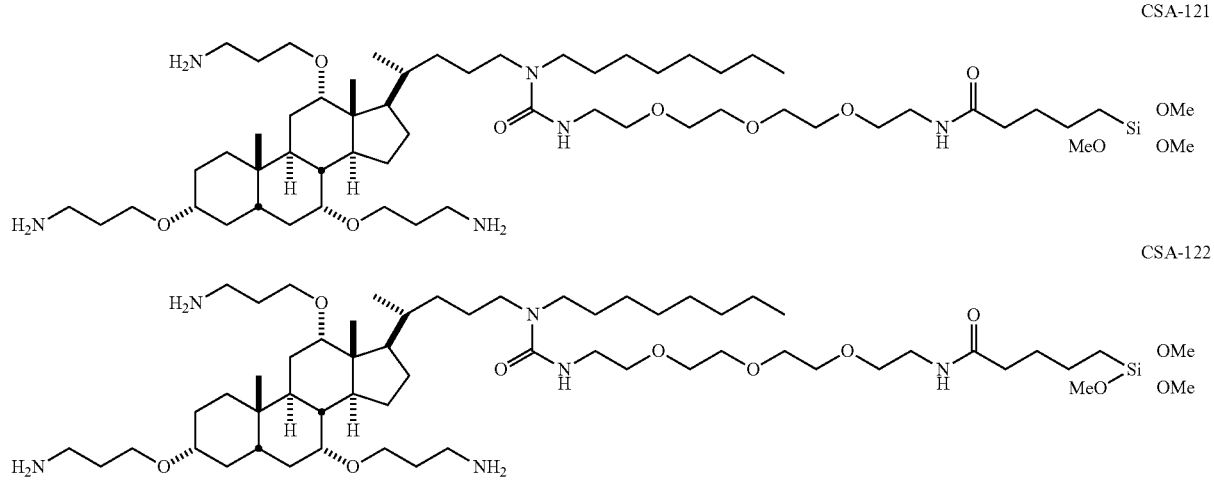

During grafting, the silane-groups on the CSA-121 ceragenin that are attached to the substrate can link up to form a crosslinked siloxane network (e.g., poly(siloxane)), with a thickness of, for example, up to 1 micron. In contrast, the silane-groups on the CSA-122 ceragenin can only react once. Hence, the silane-groups do not crosslink; and only form a monolayer on the surface.

b) rinsing the surface with ethanol (or methanol or isopropanol);
  c) thereby forming a layer of ceragenin molecules that are attached to the surface of the substrate via siloxane linkages.

Hyperspectral imaging of fluorescent-tagged ceragenin-treated polyamide membrane surfaces has demonstrated that 1) ceragenins can successfully be attached to polyamide membranes, 2) the surface coverage (distribution) of the ceragenins could be more uniform, and 3) the UV-grafting method generally leads to better attachment than the amine-linking method.

Biocidal testing of ceragenin-treated RO membranes has demonstrated that the amount of biofilm on the membrane can be reduced by as much as 80% when ceragenins are incorporated in a biofouling-resistant coating, in some experiments. Unexpectedly, very little reduction in permeate flux was observed in the ceragenin-treated membranes, in some experiments (note: flux reductions of 70-80% due to biofouling have been observed in untreated membranes).

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings. Characterizations of "preferred" features should in no way be interpreted as deeming such features as being required, essential, or critical to the invention.

All references, including patents, listed in this application are incorporated herein by reference in their entirety.

The scope of the invention is defined by the claims appended hereto.

The invention claimed is:

1. A method of attaching alkene-functionalized ceragenins to a surface of a polymer substrate using a silane-based coating and a Type-I compound, comprising, in the order listed:
   a) applying a silane-based coating to a surface of a polymer substrate, wherein the coating contains free amine groups;
   b) treating the silane-based coating with a Type-I compound comprising acid halides with an attached halogen atom that can be abstracted to leave a stable radical;
   c) contacting the Type-I treated surface with a monomer solution comprising an alkene-functionalized ceragenin monomer, a comonomer, and a solvent;
   d) adding a copper-based catalyst and a nitrogen-based ligand to the monomer solution contacting the surface, thereby initiating an atom-transfer radical polymerization (ATRP) reaction; and
   e) forming ceragenin-containing copolymer reaction products that are chemically grafted to the surface of the polymer substrate via amide and siloxane linkages;
wherein no UV light is required to initiate the polymerization reaction.

2. The method of claim 1, wherein the comonomer is an α,β-unsaturated carbonyl-type monomer; and the Type-I compound is 4-(chloromethyl)benzoyl chloride (CMBC) or bromoisobutyryl bromide; wherein 4-(chloromethyl)benzoyl chloride (CMBC) has the following structure:

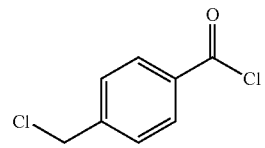

4-(Chloromethyl)Benzoyl Chloride (CMBC);

and bromoisobutyryl bromide has the following structure:

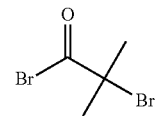

bromoisobutyryl bromide.

3. The method of claim 1, wherein the alkene-functionalized ceragenin is selected from the group consisting of CSA-105, CSA-113, CSA-109, and CSA-120; the Type-I compound is 4-(chloromethyl)benzoyl chloride (CMBC); the ceragenin comprises amine end groups that are protonated; the comonomer is selected from the group consisting of acrylamide, acrylic acid, acrylonitrile, methyl acrylate, methyl methacrylate, and maleic anhydride; and the solvent comprises a mixture of water and methanol.

4. The method of claim 1, wherein the polymer substrate comprises a polyamide membrane.

5. The method of claim 1, wherein the silane-based coating has a thickness ranging from 1 monolayer to 1 micron.

6. The method of claim 1, wherein the polymer substrate comprises a polyethylene spacer; and wherein:
   step a) comprises exposing the polyethylene spacer to an argon/oxygen plasma for at least 1-10 minutes, followed by exposing the spacer to air; immersing the spacer in a solution of 3-aminopropyltrimethoxysilane (APTMOS) in toluene (1 to 10 wt %) for at least 90 minutes at room temperature; and rinsing the spacer with toluene and then with ethanol;
   step b) comprises contacting a surface of the spacer with a solution of 4-(chloromethyl)benzoyl chloride (CMBC) in dichloromethane (1 to 10 wt %), followed by heating the solution to reflux temperature for at least 20 minutes, then removing and washing the spacer with dichloromethane, and drying in air at room temperature;
   step c) comprises adding a copper(I) bromide catalyst (1-25 weight % based on mass of monomers) and a 2,2'-bipyridine ligand (1-25 weight % based on mass of monomers) to the monomer solution;
   step d) comprises allowing the polymerization reaction to proceed for at least 1 hour at room temperature, and rinsing the spacer with ethanol;
   wherein a mole fraction of ceragenin in the monomer solution ranges from 2 to 100%, and a total monomer concentration ranges from 0.01 to 1 M; and
   wherein no UV light is required to initiate the polymerization reaction.

* * * * *